US012281550B2

(12) United States Patent
Norbeck et al.

(10) Patent No.: US 12,281,550 B2
(45) Date of Patent: *Apr. 22, 2025

(54) METHODS AND SYSTEMS TO CONTROL FLOW AND HEAT TRANSFER BETWEEN SUBSURFACE WELLBORES CONNECTED HYDRAULICALLY BY FRACTURES

(71) Applicant: Fervo Energy Company, Houston, TX (US)

(72) Inventors: Jack Norbeck, Golden, CO (US); Timothy Latimer, Houston, TX (US)

(73) Assignee: Fervo Energy Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,315

(22) Filed: Oct. 3, 2023

(65) Prior Publication Data

US 2024/0263548 A1    Aug. 8, 2024

Related U.S. Application Data

(63) Continuation of application No. 16/540,842, filed on Aug. 14, 2019, now Pat. No. 11,808,121.

(Continued)

(51) Int. Cl.
*E21B 43/12* (2006.01)
*E21B 43/16* (2006.01)
(Continued)

(52) U.S. Cl.
CPC ............ *E21B 43/126* (2013.01); *E21B 43/16* (2013.01); *E21B 43/25* (2013.01); *E21B 43/26* (2013.01)

(58) Field of Classification Search
CPC ........ E21B 43/126; E21B 43/16; E21B 43/25; E21B 43/26; Y02E 10/10; F03G 7/04
See application file for complete search history.

(56) References Cited

U.S. PATENT DOCUMENTS 3,270,816 A    9/1966 Staadt
4,043,129 A    8/1977 Mccabe et al.
(Continued)

FOREIGN PATENT DOCUMENTS

DE    102008009499 A1    8/2009
EP    3837429 A1    6/2021
(Continued)

OTHER PUBLICATIONS

"U.S. Appl. No. 16/540,842, Advisory Action mailed Jan. 14, 2022", 3 pgs.

(Continued)

*Primary Examiner* — Giovanna Wright
*Assistant Examiner* — Ronald R Runyan
(74) *Attorney, Agent, or Firm* — Schwegman Lundberg & Woessner, P.A.

(57) ABSTRACT

A controlled rate of propagation of the fluid saturation front or thermal front is desired in may oil and gas and geothermal operations. Natural fractures and fractures created during hydraulic stimulation may have heterogeneous hydraulic properties resulting in uneven flow distributions, therefore leading to short-circuiting and breakthrough issues. The present invention relates to wellbores connected hydraulically by multiple fracture zones; methods are directed to control for even flow distribution among fractures, regardless of heterogeneities in fracture hydraulic properties, and to control propagation of saturation fronts and thermal fronts in subsurface reservoirs.

20 Claims, 17 Drawing Sheets

Related U.S. Application Data

(60) Provisional application No. 62/764,837, filed on Aug. 16, 2018, provisional application No. 62/764,835, filed on Aug. 16, 2018.

(51) Int. Cl.
*E21B 43/25* (2006.01)
*E21B 43/26* (2006.01)

(56) References Cited

U.S. PATENT DOCUMENTS

| | | | |
|---|---|---|---|
| 7,647,773 | B1 | 1/2010 | Koenig |
| 9,726,157 | B2 | 8/2017 | Sweatman et al. |
| 11,808,121 | B2 | 11/2023 | Norbeck et al. |
| 2005/0072567 | A1 | 4/2005 | Steele et al. |
| 2006/0157243 | A1 | 7/2006 | Nguyen |
| 2010/0307756 | A1 | 12/2010 | Jung et al. |
| 2013/0056171 | A1 | 3/2013 | Klemencic |
| 2013/0245953 | A1 | 9/2013 | Gonzales et al. |
| 2015/0300327 | A1 | 10/2015 | Sweatman et al. |
| 2017/0211849 | A1 | 7/2017 | Muir et al. |
| 2017/0321934 | A1 | 11/2017 | Krüger |
| 2020/0217181 | A1 | 7/2020 | Norbeck et al. |

FOREIGN PATENT DOCUMENTS

| | | |
|---|---|---|
| WO | WO-2018112610 A1 | 6/2018 |
| WO | WO-2020037062 A1 | 2/2020 |

OTHER PUBLICATIONS

"U.S. Appl. No. 16/540,842, Examiner Interview Summary mailed May 23, 2023", 2 pgs.
"U.S. Appl. No. 16/540,842, Examiner Interview Summary mailed Jul. 7, 2022", 3 pgs.
"U.S. Appl. No. 16/540,842, Final Office Action mailed Mar. 15, 2023", 23 pgs.
"U.S. Appl. No. 16/540,842, Final Office Action mailed Oct. 12, 2021", 23 pgs.
"U.S. Appl. No. 16/540,842, Non Final Office Action mailed Mar. 30, 2021", 16 pgs.
"U.S. Appl. No. 16/540,842, Non Final Office Action mailed May 23, 2022", 22 pgs.
"U.S. Appl. No. 16/540,842, Notice of Allowance mailed Jul. 18, 2023", 8 pgs.
"U.S. Appl. No. 16/540,842, Preliminary Amendment filed Mar. 25, 2020", 8 pgs.
"U.S. Appl. No. 16/540,842, Response filed Mar. 14, 2022 to Advisory Action Mailed Jan. 19, 2022 and Final Office Action Mailed Oct. 12, 2021", 13 pgs.
"U.S. Appl. No. 16/540,842, Response filed Jun. 14, 2023 to Final Office Action mailed Mar. 15, 2023", 15 pgs.
"U.S. Appl. No. 16/540,842, Response filed Jun. 30, 2021 to Non Final Office Action mailed Mar. 30, 2021", 26 pgs.
"U.S. Appl. No. 16/540,842, Response filed Nov. 23, 2022 to Non Final Office Action mailed May 23, 2022", 14 pgs.
"U.S. Appl. No. 16/540,842, Response filed Dec. 13, 2021 to Final Office Action mailed Oct. 12, 2021", 13 pgs.
"European Application Serial No. 19849549.1, Communication Pursuant to Article 94(3) EPC mailed Mar. 5, 2024", 6 pgs.
"European Application Serial No. 19849549.1, Extended European Search Report mailed Jul. 21, 2022", 11 pgs.
"European Application Serial No. 19849549.1, Response filed Feb. 18, 2023 to Extended European Search Report mailed Jul. 21, 2022", 73 pgs.
"European Application Serial No. 19849549.1, Response to Communication Pursuant to Rules 161 and 162 filed Oct. 4, 2021", 18 pgs.
"International Application Serial No. PCT/US2019/046542, International Preliminary Report on Patentability mailed Feb. 25, 2021", 15 pgs.
"International Application Serial No. PCT/US2019/046542, International Search Report mailed Dec. 17, 2019", 3 pgs.
"International Application Serial No. PCT/US2019/046542, Written Opinion mailed Dec. 17, 2019", 13 pgs.
U.S. Appl. No. 16/540,842, now U.S. Pat. No. 11,808,121, filed Aug. 14, 2019, Methods and Systems to Control Flow and Heat Transfer Between Subsurface Wellbores Connected Hydraulically by Fractures.
"European Application Serial No. 19849549.1, Response filed Aug. 23, 2024 to Communication Pursuant to Article 94(3) EPC mailed Mar. 5, 2024", 9 pgs.

METHODS AND SYSTEMS TO CONTROL FLOW AND HEAT TRANSFER BETWEEN SUBSURFACE WELLBORES CONNECTED HYDRAULICALLY BY FRACTURES

This application: (i) claims benefit of priority to and claims under 35 U.S.C. § 119(e)(1) the benefit of the filing date of U.S. provisional application Ser. No. 62/764,835 filed Aug. 16, 2018; and, (ii) claims benefit of priority to and claims under 35 U.S.C. § 119(e)(1) the benefit of the filing date of U.S. provisional application Ser. No. 62/764,837 filed Aug. 16, 2018, the entire disclosures of each of which are incorporated herein by reference.

BACKGROUND OF THE INVENTION

Field of the Invention

The present invention relates to systems, methods and operations for enhancing the recovery of resources from within the ground. In particular, embodiments of the present inventions relate to novel systems and operations to alter, modify and change subterranean formations to enhance the recovery of resources from those formations. Embodiments of the present inventions relate to the recovery of subsurface resources, such as minerals, ores, gems, metals, water and energy sources including hydrocarbon and geothermal. Embodiments of the present inventions further relate to real-time adjustments to hydraulic stimulation treatments.

Typically, in the production of natural resources from formations within the earth a well or borehole is drilled into the earth to the location where the natural resource is believed to be located. These natural resources may be a heat source for geothermal energy, a hydrocarbon reservoir, containing natural gas, crude oil and combinations of these; the natural resource may be fresh water; or it may be some other natural resource that is located within the ground.

These resource-containing formations may be a few hundred feet, a few thousand feet, or tens of thousands of feet below the surface of the earth, including under the floor of a body of water, e.g., below the sea floor. In addition to being at various depths within the earth, these formations may cover areas of differing sizes, shapes and volumes.

Unfortunately, and generally, when a well is drilled into these formations the natural resources rarely flow into and out of the formation, and into the well at rates, durations and amounts that are economically viable. This problem occurs for several reasons, some of which are well understood, others of which were not as well understood, some of which may not yet be known, and several of which, prior to the present inventions were incorrect. These problems can relate to the viscosity of the natural resource, the porosity of the formation, the geology of the formation, the formation pressures, and the perforations that place the production tubing in the well in fluid communication with the formation, to name a few.

Thermal Breakthrough—Long Standing Problem

Early or premature thermal breakthrough has been observed at many hydrothermal and enhanced geothermal sites around the world, including The Geysers in the United States, Beowawe in the United States, Miravalles in Costa Rica, Cerro Prieto in Mexico, Hijiori Hot Dry Rock test site in Japan, and Rosemanowes in the United Kingdom. A review of geothermal projects in the United States found that declines in production temperature are most commonly attributed to short-circuiting through high permeability faults and fractures (as opposed to unduly close spacing between injection and production wells) (Sanyal, S. et al., 1995). A worldwide review of reinjection strategies at geothermal fields found that reinjection caused thermal breakthrough to occur at production wells within ten years at 31 different sites (Kaya et al., 2011). Premature thermal breakthrough behavior has been observed across all types of geothermal reservoirs, including low and medium-enthalpy water dominated systems, medium enthalpy two-phase systems, and high-enthalpy two-phase systems (Kaya et al., 2011).

Several fluid circulation tests were performed in deep geothermal wells at the Hijiori Hot Dry Rock test site in Japan from 2000 to 2001 (Tenma et al., 2008). One test (called Run Segment 3) involved injection into two wells and production from two offset wells. Injection rates ranged from roughly 4 kg/s to 12 kg/s, and production rates ranged from roughly 2 kg/s to 10 kg/s per well. Over approximately 90 days, one of the production wells, HDR-2a, experienced significant thermal drawdown. The wellhead temperature in production well HDR-2a dropped from 180° C. to 120° C. over roughly a 1-month period, and then dropped an additional 20° C. over the remainder of the circulation experiment. This severe level of thermal drawdown would not support long-term power generation at economic levels.

Benoit and Stock (1993) recorded declines in production temperatures for two wells at the Beowawe, Nevada, USA geothermal field, where temperatures dropped from 420° F. to 375° F. and 420° F. to 400° F. over a five-year period from 1987 to 1992. Tracer tests showed quick breakthrough times on the order of 14 days.

At Rosemanowes, MacDonald, P., Stedman, A., and Symons, G., The UK geothermal hot dry rock R&D programme. Paper presented at the Seventeenth Workshop on Geothermal Reservoir Engineering, Stanford, California, USA, 29-31 Jan. 1992) ("MacDonald et al. (1992)"), observed that "the thermal behavior of the heat exchanger was unsatisfactory (because of excessive temperature drawdown and short circuiting)." During circulation experiments, injection rates of roughly 24 kg/s and production rates of about 19 kg/s were achieved (water losses were observed to be 21%). The production temperature dropped from 80° C. to 55° C. over a three-year period from 1985 to 1988. Tracer testing showed evidence for the presence of a high permeability short-circuit pathway between the injection and production boreholes. In addition, MacDonald et al. (1992) made the following comments based on the Rosemanowes field project:

"Flow through the underground system at Rosemanowes had been dominated by the effects of short circuits. These effects were an inevitable consequence of geological heterogeneity and therefore would be a feature of any stimulated rock mass. Successful operation of an HDR (hot dry rock) system would depend on exploitation and management of these short circuits," and that "a satisfactory method for sealing short circuits, other than by mechanical sealing of the production wellbore has not yet been demonstrated." MacDonald et al. (1992)

A 55 MW power station at Miravalles, Costa Rica, began operations in March 1994 (Parini et al., 1996). Over the first few months of production, an increase in chloride concentrations was measured, which the operator attributed to rapid return of reinjected water. A tracer test was subsequently performed and indicated rapid breakthrough of roughly 30 to 40 days. Numerical modeling calibrated against the tracer tests results indicated risk of significant long term cooling the results show up to a 10% reduction in production fluid energy content over a 30-year period.

A reservoir-scale temperature decline of roughly 10° C. occurred over a 14-year period at Cerro Prieto, in part due to cold water reinjection (Lippman et al., 2004).

Timing of Multistage Stimulations

Multistage hydraulic stimulation treatments are typically performed with a pumping schedule that is replicated across all stages. For example, a slickwater treatment may involve first pumping a pad of freshwater at a relatively low flow rate to initiate fracture propagation from each cluster. Then, the injection rate may be increased, and the proppant concentration may be increased over short steps until the designed proppant concentration is met. Pumping may continue for the designed stage duration, after which freshwater is pumped to flush any proppant remaining in the wellbore into the formation. The same pumping schedule is repeated in each subsequent stage.

Minifrac, leakoff, extended leakoff, or diagnostic fracture injection tests are typically performed during drilling or directly after installing casing to determine the magnitude of the minimum principal stress; these tests are typically not performed on every well. Wellbore breakouts and drilling induced tensile fractures can be used to estimate the magnitude of the maximum principal stress when caliper logs or wellbore image logs have been performed. Distributed acoustic sensing and distributed temperature sensing fiber optic measurements can be used to evaluate cluster efficiency, but this type of analysis is typically performed after the treatment has been completed. Pressure transient analysis is commonly performed to evaluate the formation properties after the completion phase, prior to setting the well on production; these tests are typically not performed for every well.

These prior techniques have many failings, including limited applicability based upon well type and problem, other adverse or unexpected results, cost, potential for lost production time, inoperability, limited success rates (both qualitative and quantitative). Thus, for these and other reasons they have not meet the long standing need for enhanced and greater efficiency in the hydraulically stimulating, including hydraulically fracturing, formations for the recovery of resources from the earth, such as geothermal, hydrocarbons, and minerals.

Related Art and Terminology

Typically, and by way of general illustration, in drilling a well an initial borehole is made into the earth, e.g., the surface of land or seabed, and then subsequent and smaller diameter boreholes are drilled to extend the overall depth of the borehole. In this manner as the overall borehole gets deeper its diameter becomes smaller; resulting in what can be envisioned as a telescoping assembly of holes with the largest diameter hole being at the top of the borehole closest to the surface of the earth.

Typically, when completing a well, it is necessary to perform a perforation operation. In general, when a well has been drilled and casing, e.g., a metal pipe, is run to the prescribed depth, the casing is typically cemented in place by pumping cement down and into the annular space between the casing and the earth. (It is understood that many different down hole casing, open hole, and completion approaches may be used.) The casing, among other things, prevents the hole from collapsing and fluids from flowing between permeable zones in the annulus. Thus, this casing forms a structural support for the well and a barrier to the earth.

While important for the structural integrity of the well, the casing and cement present a problem when they are in the production zone. Thus, in addition to holding back the earth, they also prevent the resources or fluid from flowing into and out of the well and from being recovered. Additionally, the formation itself may have been damaged by the drilling process, e.g., by the pressure from the drilling mud, and this damaged area of the formation may form an additional barrier to the flow of resources. Similarly, in most situations where casing is not needed in the production area, e.g., open hole, the formation itself is generally tight, and more typically can be very tight, and thus, will not permit the flow of resources into and out of the well.

To address, in part, this problem of the flow of resources e.g., geothermal, hydrocarbons, etc. into the well being blocked by the casing, cement and the formation itself, openings, e.g., perforations, are made in the well in the area of the pay zone. Generally, a perforation is a small, about ¼" to about 1" or 2" in diameter hole that extends through the casing, cement and damaged formation and goes into the formation. The holes can extend from the borehole wall into the formation from about 1" to about 18", about 3" to about 10", about 4" to 6", about 3" to about 8", about 6" to about 12" and combinations and variations of these, as well as, longer and smaller distances. This hole creates a passage for the resource to flow from the formation into the well. In a typical well, a large number of these holes are made through the casing and into the formation in the pay zone.

As used herein, unless expressly stated otherwise, the term "perforations" and "perf" and "perforating" and similar such terms should be given their broadest possible meaning and would include any hole or opening formed in a borehole wall, casing, or other surface that provides fluid communication between the formation and the borehole. Generally, in a perforating operation a perforating tool or gun is lowered into the borehole to the location where the production zone or pay zone is located. The perforating gun is a long, typically round tool, that has a small enough diameter to fit into the casing or tubular and reach the area within the borehole where the production zone is believed to be. Once positioned in the production zone a series of explosive charges, e.g., shaped charges, are ignited. The hot gases and molten metal from the explosion cut a hole, i.e., the perf or perforation, through the casing and into the formation. These explosive-made perforations extend a few inches, e.g., 6" to 18" into the formation. Perforations may also be made by other systems, such as lasers, or any other device or system that places holes in the tubular, the borehole wall, the formation, and combinations and variations of these.

Prior to the present inventions, geothermal well completions typically involved open-hole or slotted-liner completions in the production interval, and the use of cased and cemented boreholes were disfavored for geothermal wells and systems. Because permeability in geothermal reservoirs is typically limited to flow along a small number of fractures or faults that act as hydraulically conductive pathways, cased and cemented wellbore completion designs were discredited based on the concept that they would cause irreconcilable formation damage that would seal off the permeable fractures. However, open-hole and slotted liner completions present many problems and limitations in terms of the tools and techniques that can be employed downhole. Embodiments of the present inventions go against this established thinking of the art, and use cased and cemented geothermal completion design, which enables the use of modified, additional and new techniques and in geothermal applications, such as multistage, multicluster hydraulic fracture treatments and proppant to be used in geothermal settings.

Prior to embodiments of the present inventions, it was believed that the goals and purpose of hydraulic fracturing, e.g., to get as much of the natural resource, i.e., oil or gas, out of the well as quickly as possible were believed to be antagonist to, and counterproductive to, the goals and objectives of geothermal systems and wells. Embodiments of the present inventions go against these established thinking of the art. As discussed in greater detail in this specification, geotherm wells require management of the geothermal heat source, and the avoidance of thermal breakthrough, which can be detrimental, damaging, and at times catastrophic, to the heat recovery efficiency and long-term sustainability of a geothermal energy recovery system. It is believed that the present inventions are the first to recognize and develop a solution to these and other thermal management problems, including thermal break through problems, that have been a long standing and ongoing problem in geothermal systems, through the utilization of the specific workover techniques, perforation patterns, hydraulic fracturing and proppant techniques, well designs, methods, and the resulting wells and systems, of the present inventions.

As used herein, unless specified otherwise, the term "earth" should be given its broadest possible meaning, and includes, the ground, all natural materials, such as rocks, and artificial materials, such as concrete, that are or may be found in the ground, including without limitation rock layer formations, such as, granite, basalt, sandstone, dolomite, sand, salt, limestone, rhyolite, quartzite and shale rock.

As used herein, unless specified otherwise, the term "borehole" should be given it broadest possible meaning and includes any opening that is created in a material, a work piece, a surface, the earth, a structure (e.g., building, protected military installation, nuclear plant, offshore platform, or ship), or in a structure in the ground, (e.g., foundation, roadway, airstrip, cave or subterranean structure) that is substantially longer than it is wide, such as a well, a well bore, a well hole, a micro hole, slimhole, a perforation and other terms commonly used or known in the arts to define these types of narrow long passages. Wells would further include exploratory, production, abandoned, reentered, reworked, and injection wells. Although boreholes are generally oriented substantially vertically, they may also be oriented on an angle from vertical, to and including horizontal. Thus, using a vertical line, based upon a level as a reference point, a borehole can have orientations ranging from 0° i.e., vertical, to 90°, i.e., horizontal and greater than 90° e.g., such as a heel and toe and combinations of these such as for example "U" and "Y" shapes. Boreholes may further have segments or sections that have different orientations, they may have straight sections and arcuate sections and combinations thereof; and for example, may be of the shapes commonly found when directional drilling is employed. Thus, as used herein unless expressly provided otherwise, the "bottom" of a borehole, the "bottom surface" of the borehole and similar terms refer to the end of the borehole, i.e., that portion of the borehole furthest along the path of the borehole from the borehole's opening, the surface of the earth, or the borehole's beginning. The terms "side" and "wall" of a borehole should to be given their broadest possible meaning and include the longitudinal surfaces of the borehole, whether or not casing or a liner is present, as such, these terms would include the sides of an open borehole or the sides of the casing that has been positioned within a borehole. Boreholes may be made up of a single passage, multiple passages, connected passages and combinations thereof, in a situation where multiple boreholes are connected or interconnected each borehole would have a borehole bottom. Boreholes may be formed in the sea floor, under bodies of water, on land, in ice formations, or in other locations and settings.

Boreholes are generally formed and advanced by using mechanical drilling equipment having a rotating drilling tool, e.g., a bit. For example, and in general, when creating a borehole in the earth, a drilling bit is extending to and into the earth and rotated to create a hole in the earth. In general, to perform the drilling operation the bit must be forced against the material to be removed with a sufficient force to exceed the shear strength, compressive strength or combinations thereof, of that material. Thus, in conventional drilling activity mechanical forces exceeding these strengths of the rock or earth must be applied. The material that is cut from the earth is generally known as cuttings, e.g., waste, which may be chips of rock, dust, rock fibers and other types of materials and structures that may be created by the bit's interactions with the earth. These cuttings are typically removed from the borehole by the use of fluids, which fluids can be liquids, foams or gases, or other materials know to the art.

As used herein, unless specified otherwise, the term "advancing" a borehole should be given its broadest possible meaning and includes increasing the length of the borehole. Thus, by advancing a borehole, provided the orientation is not horizontal, e.g., less than 90° the depth of the borehole may also be increased. The true vertical depth ("TVD") of a borehole is the distance from the top or surface of the borehole to the depth at which the bottom of the borehole is located, measured along a straight vertical line. The measured depth ("MD") of a borehole is the distance as measured along the actual path of the borehole from the top or surface to the bottom. As used herein unless specified otherwise the term depth of a borehole will refer to MD. In general, a point of reference may be used for the top of the borehole, such as the rotary table, drill floor, well head or initial opening or surface of the structure in which the borehole is placed.

As used herein, unless specified otherwise, the terms "workover," "completion" and "workover and completion" and similar such terms should be given their broadest possible meanings and would include activities that place at or near the completion of drilling a well, activities that take place at or the near the commencement of production from the well, activities that take place on the well when the well is producing or operating well, activities that take place to reopen or reenter an abandoned or plugged well or branch of a well, and would also include for example, perforating, cementing, acidizing, fracturing, pressure testing, the removal of well debris, removal of plugs, insertion or replacement of production tubing, forming windows in casing to drill or complete lateral or branch wellbores, cutting and milling operations in general, insertion of screens, stimulating, cleaning, testing, analyzing and other such activities. These terms would further include applying heat, directed energy, preferably in the form of a high power laser beam to heat, melt, soften, activate, vaporize, disengage, desiccate and combinations and variations of these, materials in a well, or other structure, to remove, assist in their removal, cleanout, condition and combinations and variation of these, such materials.

As used herein, unless specified otherwise, the terms "formation," "reservoir," "pay zone," "production zone" and similar terms, are to be given their broadest possible meanings and would include all locations, areas, and geological features within the earth that contain, may contain, or are believed to contain, a natural resource, e.g., geothermal energy, hydrocarbons, etc.

Generally, the term "about" and the symbol "~" as used herein unless stated otherwise is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

As used herein, unless specified otherwise, the terms "geothermal", "geothermal well", "geothermal resource", "geothermal energy" and similar such terms, should be given their broadest possible meaning and including wells, systems and operations that recover or utilize the heat energy that is contained within the earth. Such systems and operations would include enhanced geothermal well, engineered geothermal wells, binary cycle power plants, dry steam power plants, flash steam power plants, open looped systems, and closed loop systems.

As used herein, unless specified otherwise, the terms "field," "oil field" "geothermal field" and similar terms, are to be given their broadest possible meanings, and would include any area of land, sea floor, or water that is loosely or directly associated with a formation, and more particularly with a resource containing formation, thus, a field may have one or more exploratory and producing wells associated with it, a field may have one or more governmental body or private resource leases associated with it, and one or more field(s) may be directly associated with a resource containing formation.

As used herein, unless specified otherwise, the terms "conventional gas", "conventional oil", "conventional", "conventional production" and similar such terms are to be given their broadest possible meaning and include hydrocarbons, e.g., gas and oil, that are trapped in structures in the earth. Generally, in these conventional formations the hydrocarbons have migrated in permeable, or semi-permeable formations to a trap, or area where they are accumulated. Typically, in conventional formations a non-porous layer is above, or encompassing the area of accumulated hydrocarbons, in essence trapping the hydrocarbon accumulation. Conventional reservoirs have been historically the sources of the vast majority of hydrocarbons produced. As used herein, unless specified otherwise, the terms "unconventional gas", "unconventional oil", "unconventional", "unconventional production" and similar such terms are to be given their broadest possible meaning and includes hydrocarbons that are held in impermeable rock, and which have not migrated to traps or areas of accumulation.

As used herein, unless specified otherwise, the terms "hydrocarbon exploration and production", "exploration and production activities", "E&P", and "E&P activities", and similar such terms are to be given their broadest possible meaning, and include surveying, geological analysis, well planning, reservoir planning, reservoir management, drilling a well, workover and completion activities, hydrocarbon production, flowing of hydrocarbons from a well, collection of hydrocarbons, secondary and tertiary recovery from a well, the management of flowing hydrocarbons from a well, and any other upstream activities.

As used herein, unless specified otherwise, the terms "poroelastic", "poroelasticity", "poroelastic stresses", "poroelastic forces" and similar such terms should be given their broadest possible meanings and would include the forces, stresses and effects that are based upon the interaction between fluid flow and solid deformation within a porous medium. Typically, in evaluating poroelastic effects Darcy's law, which describes the relation between fluid motion and pressure within a porous medium, is coupled with the structural displacement of the porous matrix.

The ability of, or ease with which, the natural resource can flow out of the formation and into the well or production tubing (into and out of, for example, in the case of engineered geothermal wells, and some advanced recovery methods for hydrocarbon wells) can generally be understood as the fluid communication between the well and the formation. As this fluid communication is increased several enhancements or benefits may be obtained: the volume or rate of flow (e.g., gallons per minute) can increase; the distance within the formation out from the well where the natural resources will flow into the well can be increase (e.g., the volume and area of the formation that can be drained by a single well is increased, and it will thus take less total wells to recover the resources from an entire field); the time period when the well is producing resources can be lengthened; the flow rate can be maintained at a higher rate for a longer period of time; and combinations of these and other efficiencies and benefits.

Fluid communication between the formation and the well can be increased by the use of hydraulic stimulation techniques. The first uses of hydraulic stimulation date back to the late 1940s and early 1950s. In general, hydraulic treatments involve forcing fluids down the well and into the formation, where the fluids enter the formation and crack, e.g., force the layers of rock to break apart or fracture. These fractures create channels or flow paths that may have cross sections of a few micron's, to a few millimeters, to several millimeters in size, and potentially larger. The fractures may also extend out from the well in all directions for a few feet, several feet and tens of feet or further. It should be remembered that the longitudinal axis of the well in the reservoir may not be vertical: it may be on an angle (either slopping up or down) or it may be horizontal. The section of the well located within the reservoir, i.e., the section of the formation containing the natural resources, can be called the pay zone.

Typical fluid volumes in a propped fracturing treatment of a formation in general can range from a few thousand to a few million gallons. Proppant volumes can approach several thousand cubic feet. In general, the objective of a proppant fracturing in hydrocarbon wells is to create and enhance fluid communication between the wellbore and the hydrocarbons in the formation, e.g., the reservoir. Thus, proppant fracturing techniques are used to create and enhance conductive pathways for the hydrocarbons to get from the reservoir to the wellbore. Further, a desirable way of enhancing the efficacy of proppant fracturing techniques is to have uniform proppant distribution. In this manner a uniformly conductive fracture along the wellbore height and fracture half-length can be provided. However, the complicated nature of proppant settling, and in particular in non-Newtonian fluids often causes a higher concentration of proppant to settle down in the lower part of the fracture. This in turn can create a lack of adequate proppant coverage on the upper portion of the fracture and the wellbore. Clustering of proppant, encapsulation, bridging, crushing and embedment are a few negative occurrences or phenomena that can lower the potential conductivity of the proppant pack, and efficacy of hydraulic fracture and the well.

The fluids used to perform hydraulic fracture can range from very simple, e.g., water, to very complex. Additionally, these fluids, e.g., fracing fluids or fracturing fluids, typically carry with them proppants; but not in all cases, e.g., when acids are used to fracture carbonate formations. Proppants are small particles, e.g., grains of sand, aluminum shot, sintered bauxite, ceramic beads, resin coated sand or ceramics, that are flowed into the fractures and hold, e.g., "prop" or hold open the fractures when the pressure of the fracturing fluid is reduced and the fluid is removed to allow the resource, e.g., hydrocarbons, to flow into the well.

In this manner the proppants hold open the fractures, keeping the channels open so that the hydrocarbons can more readily flow into the well. Additionally, the fractures greatly increase the surface area from which the hydrocarbons can flow into the well.

Typically fracturing fluids consist primarily of water but also have other materials in them. The number of other materials, e.g., chemical additives used in a typical fracture treatment varies depending on the conditions of the specific well that is being fractured. Generally, a typical fracture treatment will use from about 2 to about 25 additives.

Generally, the predominant fluids being used for fracture treatments in the shale formations are water-based fracturing fluids mixed with friction-reducing additives, e.g., slick water, or slick water fracs. Overall the concentration of additives in most slick water fracturing fluids is generally about 0.5% to 2% with water and sand making up 98% to 99.5% by weight. The addition of friction reducers allows fracturing fluids and proppant to be pumped to the target zone at a higher rate and reduced pressure than if water alone were used.

Although hydraulic stimulation has been used in geothermal wells, the use of proppants has generally not been used, and its use has been discredited by those in the art.

Generally, in prior geothermal wells, even those that have been hydraulically stimulated, the performance and efficiency of the well, and geothermal power plant, has been less than desirable and suboptimal. Most importantly, geothermal fluid circulation rates have tended to be too low to support commercial levels of power generation and thermal breakthrough has tended to occur before the intended duration of project life. This suboptimal performance has hindered the adoption of geothermal energy, making its replace of hydrocarbon energy sources difficult. This suboptimal performance has reduced the ability of geothermal energy, which is a clean, carbon free energy source, from being widely adopted and replacing carbon emitting, e.g., coal, oil, natural gas, power generation sources.

One of the reasons for this lack of efficiency, and suboptimal performance of geothermal wells and plants is the lack of uniformity in the formation containing the geothermal resource, e.g., the subterranean hot rock. This heterogeneity is ubiquitous in the subsurface and represents a significant barrier toward successful design of a reservoir engineering strategy for optimal resource exploitation. Permeability can often be described through a log-normal probability distribution function, suggesting that flow can become localized within a small number of relatively high permeability zones. In subsurface systems where reservoir behavior is dominated by flow through fractures, heterogeneity in fracture permeability can result in poor or uncontrolled reservoir performance. For example, 'thief zones' can cause breakthrough during waterflood or enhanced oil recovery operations, effectively bypassing large volumes of trapped oil. In geothermal reservoirs, fracture zones that take high flow rates can cool relatively quickly causing premature thermal breakthrough; moreover, thermal stresses generated by cooling in these high-flow pathways tend to further increase the zone's permeability contributing to a positive-feedback loop.

A prior technique to address heterogeneity issues, and which has not proved effective is the use of liners, plugs and other zonal isolation technologies, to attempt to address and control flow of fluids through the formation. During production, scab liners are used to isolate breaches in casing or ineffective perforations. During hydraulic stimulation, perforation clusters are designed to distribute flow among several fractures within a single stage based on the limited entry perforation pressure drop effect; these designs ensure uniform fracture propagation from a single well within each individual treatment stage, and the cluster design is typically replicated for all stages. Chemical diverters have been used in geothermal wells with open-hole or slotted liner completions to temporarily screen out high-permeability pathways and to divert flow towards stimulating less permeable pathways. Downhole instruments can be used to control flow rates in various sections of wellbores, but these are often expensive systems, that have failed to fully address the problems with and inefficiencies of prior geothermal wells and plants.

As used herein, unless stated otherwise, room temperature is 25° C. And, standard ambient temperature and pressure is 25° C. and 1 atmosphere. Unless expressly stated otherwise all tests, test results, physical properties, and values that are temperature dependent, pressure dependent, or both, are provided at standard ambient temperature and pressure.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

There has been a long-standing and unfulfilled need for the reduction of greenhouse gasses; and, in particular, the emission of such gasses in the production of energy, in particular electrical energy. Geothermal energy production, although initially promising, has failed to meet this long-standing need for clean energy production. A long standing and unsolved problem and cause of this failure is thermal breakthrough and short-circuiting in geothermal energy systems. The present inventions, among other things, solve these needs and long standing problems by providing the systems, materials, articles of manufacture, devices and processes taught, disclosed and claimed herein.

There has been a long-standing and unfulfilled need for the reduction of greenhouse gasses; and, in particular, the emission of such gasses in the production of energy, in particular electrical energy. Geothermal energy production, although initially promising, has failed to meet this long-standing need for clean energy production. A long standing and unsolved problem and cause of this failure is the heterogeneity of the formation containing the geothermal resource, and the fractures in that formation. The present inventions, among other things, solve these needs and long standing problems by providing the systems, materials, articles of manufacture, devices and processes taught, disclosed and claimed herein.

The present inventions address, mitigate and overcome this long-standing problem of thermal break through, short circuiting, and heterogeneity, among other problems with wells and subterranean resource recovery; and thus, provide enhanced and optimized geothermal wells and plants. In turn, this provides the potential to greatly reduce the amount of greenhouse gasses, e.g., $CO_2$, associated with energy production.

The present inventions, among other things, solve these needs by providing the systems, materials, articles of manufacture, devices and processes taught, disclosed and claimed herein.

A method of providing optimized recovery of geothermal energy for a formation while reducing thermal breakthrough, the method including: selecting a formation below the surface of the earth, the formation including a geothermal heat source; selecting a first well and a second well in the formation; wherein each well has a vertical section and a non-vertical section; hydraulically fracturing the formation by pumping a fracturing fluid under pressures in excess of the fracture pressure of the formation through a plurality of perforations in a side wall in the non-vertical section of the first well, the second well or both wells; whereby a substantially uniform tortuous flow path is established between the first well and the second well; wherein the substantially uniform tortuous flow path can transmit more than 40 Kg/s (kilograms of fluid/second) of a heat recovery fluid from the first well to the second well.

Additionally, there is provided these methods, plans, wells and systems having one or more of the following features: wherein the plurality of perforations have: a first stage having from 3 to about 20 perforations, and a second stage having from 3 to about 20 perforations; wherein the pumping pressure is less than 90% of the fracture pressure and the flow rate is from about 40 Kg/s to about 100 Kg/s; wherein the pumping pressure is less than 90% of the fracture pressure and the flow rate is from about 40 Kg/s to about 100 Kg/s; wherein the plurality of perforations have: a first stage having from 3 to about 20 perforations, and a second stage having from 3 to about 20 perforations, wherein the number of perforations in the second stage is different from the number of perforations in the first stage; and, wherein the fracture fluid has a proppant.

Still further, there is provided a limited entry perforation (LEP) geothermal energy system, the system including: a first well extending from above a surface of the earth into the earth and into a formation containing a geothermal heat source; a second well extending from above the surface of the earth into the earth and into the formation containing a geothermal heat source defining a geothermal reservoir; the first well having a heel and a horizontal producing section, wherein the horizontal producing section has a casing and extends into the geothermal reservoir; the second well extending into the geothermal reservoir; a producing section of the first well including a plurality of stages, wherein each stage has a plurality of perforations through the casing and into the geothermal reservoir; a plurality of fracture zones in the geothermal reservoir placing the stages of the first well in fluid communication with the second well, at least one of the fracture zones associated with at least one of the stages of the producing section of the first well; wherein the associated fracture zone defining a tortuous fluid flow path for a heat recovery fluid through the geothermal reservoir; and, whereby the configuration of the perforations and the fracture zones provide a substantially uniform flow path between the producing section and the second well.

Moreover, there is provided these methods, plans, wells and systems having one or more of the following features: wherein the perforations in at least one of the stages is zero phased; wherein the perforations in at least one of the states is 60° phased; wherein the plurality of perforations in each of the stages defines a cluster; wherein the first well is an injection well; wherein the fracture zones comprise a plurality of proppants; wherein the proppants define a proppant pack; wherein the proppants comprise microproppants; wherein the proppant pack is a monolayer distribution of the proppant in the fractures; wherein a majority of each the fracture zones have a different flow characteristic; wherein the perforations in each of a majority of the stages define a flow different flow characteristic, whereby a majority of the stages have a different flow characteristic; wherein the substantially uniform flow is characterized in part by having a flow across at least 85% of the perforations that is uniform; wherein the substantially uniform flow is characterized in part by having a flow across at least 85% of the perforations that is highly uniform; wherein the substantially uniform flow is characterized in part by having a flow across at least 85% of the stages that is uniform; wherein the substantially uniform flow is characterized in part by having a flow across at least 85% of the stages that is highly uniform; wherein the substantially uniform flow is characterized in part by having a flow across all of the stages that is uniform; wherein the substantially uniform flow is characterized in part by having a flow across all of the stages that is highly uniform; wherein the producing section defines a length and the substantially uniform flow is characterized in part by having a flow across at least 80% of the length of the producing section that is uniform; wherein the producing section defines a length and the substantially uniform flow is characterized in part by having a flow across at least 80% of the length of the producing section that is highly uniform; wherein the substantially uniform flow is characterized in part by a linear temperature front; and, wherein the substantially uniform flow is characterized in part by a linear temperature front over time.

Still additionally, there is provided a well system for the recovery of geothermal energy, the system including: an injection well in a geothermal reservoir below a surface of the earth; a producing well in the geothermal reservoir; a fluid flow path through the geothermal reservoir and placing the injection well and the producing well in fluid communication, whereby the system is configured to flow a heat recovery fluid from the injection well through the reservoir and into the producing well; the fluid flow path including a plurality of fracture zones, wherein a majority of the fracture zones have different flow characteristic; and, the injection well including a plurality of stages, wherein each of the stages has a predetermined perforation pattern, wherein the predetermined perforation pattern is based in part upon the flow characteristics of the fracture zones; whereby the system provides for a uniform temperature front of a heat recovery fluid through the reservoir between the injection well and the production well.

Furthermore, there is provided a method to achieve even flow in fractures distributed across two or more stages of a borehole having vertical and horizontal sections, the method including: selecting a horizontal section of a borehole in a reservoir containing a natural resource; wherein the selected horizontal section defines a length and has a series of hydraulic fracture treatment stages; defining a plurality of perforation clusters along the length of the selected horizontal section, wherein each perforation cluster has a series of perforation holes that cause a friction pressure drop when fluid flows through; optimizing the friction pressure drop across each cluster within an individual treatment stage based on the flow conditions during the hydraulic fracturing treatment; and optimizing the friction pressure drop across each perforation cluster along multiple treatment stages based on the flow conditions during long-term operations.

In addition, there is provided a method to achieve even flow in fractures distributed across two or more stages of a borehole having vertical and horizontal sections, the method including: selecting a horizontal section of a borehole in a reservoir containing a natural resource; wherein the selected horizontal section defines a length and has a series of hydraulic fracture treatment stages; defining a plurality of fractures or fracture zones that intersect the wellbore; optimizing a fluid additive to react with the reservoir material or proppant material to cause either precipitation or dissolution; injecting the fluid additive during relatively long-term fluid circulation operations to preferentially modify the permeability of fracture zones that receive relatively large portions of the total flow.

Yet further, there is provided a method to achieve even flow in fractures distributed across two or more stages of a borehole having vertical and horizontal sections, the method including: step a—selecting a horizontal section of a borehole in a reservoir containing a natural resource; wherein the selected horizontal section defines a length and has a series of perforation stages; step b—defining a plurality of n clusters along the entire length of the selected horizontal section, wherein each cluster has a series of perforation; step c—determining the pressure drop for a cluster in the plurality; step d—optimizing the pressure drop for the cluster selected in step c; and, step e—repeating steps c. and d, for each cluster in the plurality whereby the pressure drop for the selected horizontal section is optimized. Moreover, there is provide this method: wherein n is from 2 to 100; wherein n is from 10 to 50; wherein n is greater than 5; wherein n is greater than 10; wherein n is greater than 50; and wherein one or more of the steps is repeated at least 3 times Still further, there is provided these methods, plans, wells and systems having one or more of the following features: wherein the natural resource is a hydrocarbon; wherein the natural resource is an oil; wherein the natural resource is a geothermal resource; and wherein the length is from about 50 feet to about 5,000 feet.

Moreover, there is provided an optimized well plan for perforating a borehole in a reservoir containing a natural resource, the optimized well plan obtained by a method to achieve even flow in fractures distributed across two or more stages of a borehole having vertical and horizontal sections, the method including: selecting a horizontal section of a borehole in a reservoir containing a natural resource; wherein the selected horizontal section defines a length and has a series of perforation stages; defining a plurality of clusters along the length of the selected horizontal section, wherein each cluster has a series of perforation, determining the pressure drop for a cluster; optimizing the pressure drop for the cluster; and, optimizing the pressure drop for the selected horizontal section.

Still further, there is provided these methods, plans, wells and systems having one or more of the following features: a method for completing a well in a reservoir contain a natural resource including: obtaining an optimized well plan, perforating a borehole in the reservoir as provided in the optimized well plan; and, wherein the natural resource is selected from the group consisting of a hydrocarbon source, crude oil, natural gas, and a geothermal energy source.

Still additionally, there is provided a method of recovering resource from a well in a reservoir containing a natural resource including: producing the natural resource from the a well completed, at least in part, based upon: an optimization well plan; or one of these optimization well plans.

In addition, there is provided an optimized well plan for perforating a borehole in a reservoir containing a natural resource, the optimized well plan obtained by a method to achieve even flow in fractures distributed across two or more stages of a borehole having vertical and horizontal sections, the method including: step a—selecting a horizontal section of a borehole in a reservoir containing a natural resource; wherein the selected horizontal section defines a length and has a series of perforation stages; step b—defining a plurality of n clusters along the entire length of the selected horizontal section, wherein each cluster has a series of perforation; step c—determining the pressure drop for a cluster in the plurality; step d—optimizing the pressure drop for the cluster selected in step c; and, step e—repeating steps c. and d. for each cluster in the plurality; whereby the pressure drop for the selected horizontal section is optimized.

Still further, there is provided a method of obtaining even flow in fractures to improve thermal sweep efficiency and mitigate thermal breakthrough based, at least in part, on a limited entry effect, the method including: selecting a field including a well connected hydraulically by fractures to one or more offset wells, wherein the wells are in the earth and are associated with in a natural resource containing reservoir in the earth; calculating a limited entry perforation pressure drop in an injection well, based at least in part on the flow rates expected during long-term fluid circulation through the system; determining a configuration of perforation clusters to achieve a limited entry effect that results in even flow distribution over all fracture zones, regardless of heterogeneity in transmissivity of each fracture zone.

Yet additionally, there is provided, a method of improving thermal sweep efficiency the method including: determining a fracture spacing designed to improve thermal sweep efficiency and mitigate thermal breakthrough; wherein a fracture half-spacing is equal to the characteristic distance of investigation of a temperature transient for a characteristic time equal to the project lifetime.

Still further, there is provided these methods, plans, wells and systems having one or more of the following features: a wherein fracture spacing is reduced, thereby reducing the mass flow rate within each fracture, wherein thermal sustainability is provided; wherein fracture intensity is increased, thereby reducing the mass flow rate within each fracture, wherein thermal sustainability is provided; wherein the system has equipment selected from the group consisting of distributed networks, distributed fiber optic networks, pressure sensors, acoustic sensors, temperature sensors, smart well systems, intelligent completions, distributed temperature fiber optics, and distributed acoustic sensing fiber optics; including obtaining data from equipment selected from the group consisting of distributed networks, distributed fiber optic networks, pressure sensors, acoustic sensors, temperature sensors, smart well systems, intelligent completions, distributed temperature fiber optics, and distributed acoustic sensing fiber optics; and, including: obtaining data from equipment selected from the group consisting of distributed networks, distributed fiber optic networks, pressure sensors, acoustic sensors, temperature sensors, smart well systems, intelligent completions, distributed temperature fiber optics, and distributed acoustic sensing fiber optics;

and using the obtained data to in part select a perforation placement, a fracture plan, or both.

Still further, there is provided injecting a heat recovery fluid into one or more of these wells, systems, or a well or system made according to one or more of these methods or plans, flowing the injected heat recovery fluid out of perforations in an injector well and into a pay zone of a geothermal resource containing formation; wherein the fluid his heated by the formation; flowing the heated working fluid into a production well and, to the surface of the earth where the heat from the heated fluid is recovered and used to generate electricity.

Additionally, there is provided the method of generating electricity by operating one or more of these wells, systems, or a well or system made according to one or more of these methods or plans.

Further, there is there is provided the method of generating electricity by operating one or more of these wells, systems, or a well or system made according to one or more of these methods or plans, wherein the flow of the working fluid through the formation between the injection well and the production well has a uniform temperature front.

Accordingly, there is provided these systems, plans, methods and wells having one or more of the following features: the limited entry effect is taken advantage of to cause even distribution of flow and uniform fracture propagation during the stimulation phase as well as to distribute flow evenly across all fractures during the post-stimulation production phase; the perforation cluster design considers the flowing conditions during both the stimulation and long-term production phase; even flow in fractures to improve thermal sweep efficiency and mitigate thermal breakthrough is achieved based on the limited entry effect by distributed flow evenly across all fractures in the system; proppants, including 40 mesh, 70 mesh, 100 mesh, microproppant (sub-100 mesh, 200 mesh, and finer) and combinations thereof, are used to promote uniform aperture distribution among a set of fractures connecting two or more wellbores; fracture spacing is designed to improve thermal sweep efficiency and mitigate thermal breakthrough; and, the initial wellbore completion program is designed to incorporate subsequent refracturing to improve thermal sweep efficiency.

Accordingly, there is provided these systems, plans, methods and wells having one or more of the following features: wherein a field test procedure describes a method to determine the injectivity of a hydraulic stimulation treatment stage as a pre-characterization step directly before the treatment; wherein a field testing procedure describes a method to characterize the potential for splay fractures to propagate from the tips of preexisting natural fractures; and wherein field testing procedure describes a method to characterize the potential for propagating fractures to terminate against or propagate through preexisting natural fractures.

DESCRIPTION OF THE PREFERRED EMBODIMENTS

Figure 1A:
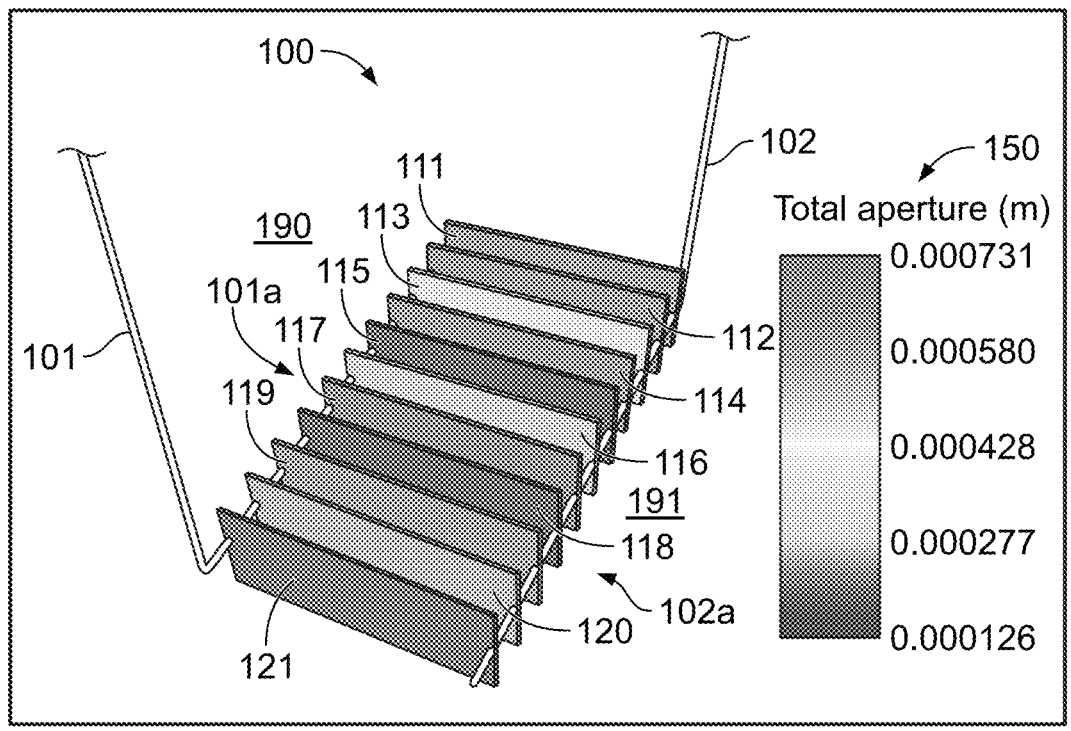
FIG. 1A is a schematic perspective view of an embodiment of a geothermal system in accordance with the present inventions, showing aperture size of the fractures.

In general, the present invention relates to embodiments of systems, methods and configurations for wellbores connected hydraulically by one or more fracture zones in subsurface resource containing reservoirs, such as geothermal reservoirs. In particular, some embodiments are generally directed to control flow distribution among fractures, and between wells, addressing heterogeneities in fracture hydraulic properties; and providing predetermined control of resource extraction, e.g., geothermal energy, in these subsurface reservoirs.

In general, embodiments of the present inventions are directed to real-time adjustments to hydraulic stimulation treatment procedure based on characterization of reservoir properties, with application to oil and gas, geothermal, and mining activities. These embodiments include methods of operating wells to improve and enhance the recovery of resources for the earth, based at least in part, on using hydraulic stimulation plans developed from real-time monitoring and adjustment of hydraulic stimulation activities. These embodiments have application to geothermal activities and to oil and gas activities, such as waterflooding, steam flooding, steam assisted gravity drainage, and enhanced oil recovery.

Embodiments of the present inventions have application to geothermal energy activities, where thermal energy is extracted from subsurface formations by circulating a working fluid, such as water, brine, or carbon dioxide, through the formation and recovering the heated fluid. Embodiments of the present invention are directed toward systems, methods and configurations to control and manage fluid flow, heat flow and both, between wellbores connected hydraulically by fractures or zones of fractures in subsurface formations.

Although the focus of the present specification is toward heat flows, geothermal reservoirs, geothermal wells, geothermal energy systems and geothermal energy management and production, as well as the recovery of hydrocarbons, the present inventions can have applications to recover other subterranean resources, such as minerals, ores and water.

The commercial viability of a geothermal power system depends on the long-term thermal sustainability of the reservoir. Thermal energy recovery efficiency is defined as the amount of heat recovered over the lifetime of a project relative to the initial amount of heat in place. Thermal breakthrough is defined as the time at which the temperature of the produced fluid has dropped by a threshold amount, which is controlled by the rate at which the thermal front propagates through the reservoir. The present invention relates to methods to design geothermal reservoir systems to control heat recovery efficiency and thermal breakthrough to improve the system's thermal sustainability.

In general, embodiments of the present well configurations have one, two, three, four or more wells. These wells can be vertical, vertical with horizontal section, vertical with sloped section, branched configurations, comb configurations, combinations and variations of these, and other configurations known to or later developed by the art and combinations and variations of these. These wells can have a TVD of from about 1,000 feet (ft) to about 20,000 ft, from about 2,000 ft to about 10,000 ft, from about 1,000 ft to about 5,000 ft, from about 2,000 ft to about 15,000 ft, greater than 1,000 ft, greater than 2,000 ft, less than 15,000 ft, less than 25,000 ft and all values within these ranges, as well as larger and smaller values. These wells can have MD from about 1,000 feet (ft) to about 25,000 ft, from about 2,000 ft to about 10,000 ft, from about 1,000 ft to about 5,000 ft, from about 2,000 ft to about 15,000 ft, greater than 1,000 ft, greater than 2,000 ft, less than 15,000 ft, less than 25,000 ft and all values within these ranges, as well as larger and smaller values.

In a pay zone, i.e., the section of the reservoir in the formation containing the sought-after natural resource (e.g., geothermal heat energy, hydrocarbons, etc.), the borehole can have a diameter of from about 2 inches (") to about 16", about 2" to about 10", about 4½", about 5", about 5½", about 7⅝" about 9⅜", and all sizes within these ranges, as well as, larger and smaller diameters. It should be understood that in a cased well, the tubular that is adjacent to, or closest to, the borehole wall, i.e. the outer most tubular, will have an outside diameter that is the same as, or smaller than, the diameter of the borehole, such as, in the situation where there is cement between the outer most tubular and the borehole wall.

In an embodiment, the wells have perforations and stimulations that provide for substantially uniform flow across all of the perforations in a producing section of the well. Thus, the pay zone of the formation has one, two, three, four or more boreholes. One or more, and preferably all of these boreholes have producing sections. These producing sections can be from about 20 ft to about 150 ft, about 50 ft to about 200 ft, about 100 ft to about 350 ft, about 50 ft to about 250 ft, about 20 ft to about 300 ft in length, and combinations and variations of these, as well as greater lengths. These producing sections have perforations, and can have an average number of perforations per length of about 1.5/ft to about 0.025/foot.

In a preferred embodiment these producing sections have one, two, three, four, five, six or more stages. A stage is a section of the producing section that has perforations, typically each stage is separated by a section of the borehole with no perforations, i.e., a non-perforated section. These non-perforated sections can be from about 5 ft to about 10 ft, about 10 ft to about 25 ft, and about 2 ft to about 20 ft, and combinations and variations of these. The non-perforated sections can be the same or different lengths in a producing section. The perforations in a stage can have from 2 to 100 or more perforations, from about 5 to about 10, from about 10 to about 20, from about 20 to about 40, and combinations and variations of these, and larger numbers. The spacing for the perforations in each stage, can be from about 2 ft to about 0.025/ft, about 0.5/ft, about 0.4 ft, about 0.8 ft, about 1/ft, about 0.1/ft to about 0.5/ft, about 0.3/ft to about 0.8/ft, about 1/ft. to about 0.25/ft and combinations and variations of these, as well as, larger and smaller spacings. The stages can have the same or different number of perforations and spacing of the perforations. The perforations in each stage, or in a cluster, can be arranged around the circumference of the borehole, which can be referred to as the phasing of the perforations, or phasing. Thus, the orientation around the borehole, e.g., degrees around the borehole can be varied, e.g., from 0° to 90° to 180° to 270° to 0°, and thus, any point around 360°. These variations around the circumference of the borehole can be the same or different for each stage. The length of each stage can be from about from about 5 to about 10, from about 10 to about 20, from about 20 to about 40, from about 25 ft to about 100 ft, and combinations and variations of these, as well as, longer distances.

In embodiments the production sections have from 5 to 10, 5 to 50, 5 to 25, 10 to 30, 15 to 40, 25 to 60, 2 to 50, more than 10, more than 20, more than 30 stages and combinations and variations of these as well as larger and smaller numbers.

In a preferred embodiment the perforation orientation is 60° phasing, which would be shots that are spaced evenly around the borehole. In an embodiment the perforations orientation is zero degree phasing where all the perforations in a cluster are oriented the same, for example, all aimed in one direction, e.g., all aimed up or all aimed down. In embodiments where control or monitoring lines are installed, e.g., fiber optic cables are installed permanently, for example in the cement behind casing, the orientation of the clamps holding the fiber bundle to the casing are mapped with magnetic sensors along the length of the horizontal well prior to perforating, and then zero degree phasing is used to shoot on the opposite side of the fiber cable.

The perforations in a stage may also be placed in clusters. A perforation cluster is a series of perforations placed along a relatively short interval of the wellbore at a specific point along the wellbore or in a stage. A typical perforation cluster is about 6 feet long, with a total of five to ten perforation shots distributed around the circumference of the wellbore at specific phasing angles and along the cluster interval. The cluster can be from about 1 foot to 25 feet, about 1 foot to 10 feet, about 2 feet to 12 feet, about 4 feet to 15 feet, and combinations and variations of these, as well as longer lengths. A cluster can have one, two, three, four, five, ten, fifteen, from one to twenty or more shots in them. The spacing for the clusters in each stage, can be from about 2 ft to about 0.025/ft, about 0.5/ft, about 0.4 ft, about 0.8 ft, about 1/ft, about 0.1/ft to about 0.5/ft, about 0.3/ft to about 0.8/ft, about 1/ft. to about 0.25/ft and combinations and variations of these, as well as, larger and smaller spacings. The spacing of the clusters, as well as the number of perforations in each cluster, can be the same or different each cluster and for each stage.

Embodiments of geothermal systems, wells and producing sections, in accordance with the present inventions, can have one or more of these forgoing features relating to the number and spacing of boreholes, production sections, stages, non-perforated sections, perforations, clusters and combinations and variations of these.

Embodiments of the producing section of the well, in embodiments of the present geothermal systems, have flow across at least 80%, at least 85%, at least 90% of the perforations that is uniform and preferably highly uniform. By "uniform flow" it is meant that the perforations in a given length have a flow that is within 10% of each other (for a given set of pressures and flow rates). By "highly uniform" it is meant that the perforations in a given length have a flow that is within 5% of each other (for a given set of pressures and flow rates).

Embodiments of the present wells, regardless of the flow across individual perforations or stages, have flow across at least 80%, at least 85%, at least 90%, and at least 95%, of the length of the producing section that is uniform, and more preferably highly uniform.

Embodiments of the present wells, regardless of the flow across individual perforations, have flow across at least 80%, at least 85%, at least 90%, and at least 95%, of the length of a stage that is uniform, and more preferably highly uniform.

Embodiments of the present wells, regardless of the flow across individual perforations or stages, have flow across at least 80%, at least 85%, at least 90%, and at least 95%, of the length of the pay zone located between an injection well and a production well that is uniform, and more preferably highly uniform.

Embodiments of the present wells, regardless of the flow across individual perforations, have flow across at least 80%, at least 85%, at least 90%, and at least 95%, of the fractures placing an injection well in fluid communication with a production well that is uniform, and more preferably highly uniform.

Embodiments of geothermal systems, wells and producing sections, in accordance with the present inventions, can have one or more of these forgoing flows across the producing section, stages, perforations and combinations and variations of these.

Generally, an even flow of the injection fluid (e.g., heat recovery fluid) between the injection well and the production well result in a temperature profile between these two wells that is even, e.g., appears linear and has a length in the same direction as the length of the wells, and preferably is parallel to the wells.

In an embodiment of the invention, even flow between the injection and production well in multiple fractures distributed across two or more stages is achieved by considering the arrangement of perforation geometry along the entire lateral section of the wellbore, as opposed to a single stimulation stage only. Perforation pressure drop, which depends on the geometry of the perforation design and the flow rate flowing through the perforations, can be calculated as (equation 1):

$$\Delta p = \frac{0.808 Q^2 \rho}{C^2 N^2 D^4},$$

where $\Delta p$ is the perforation pressure drop, Q, is the volumetric flow rate through the perforation, $\rho$ is fluid density, C is the coefficient of discharge, N is the number of perforation shots in the cluster, and D is the diameter of the perforations. The number of perforation shots, the shot geometry, and the perforation diameter of each cluster are tuned to promote even flow distribution across treatment stages that were initially isolated during stimulation. The perforation design considers the flow rates expected at each cluster (fracture) both during the stimulation treatment phase and the long-term injection, production, or circulation phase. In this manner, even flow distribution is achieved during each individual stimulation treatment stage as well as during long-term injection, production, or circulation when the entire wellbore is open to flow.

Figure 1B:
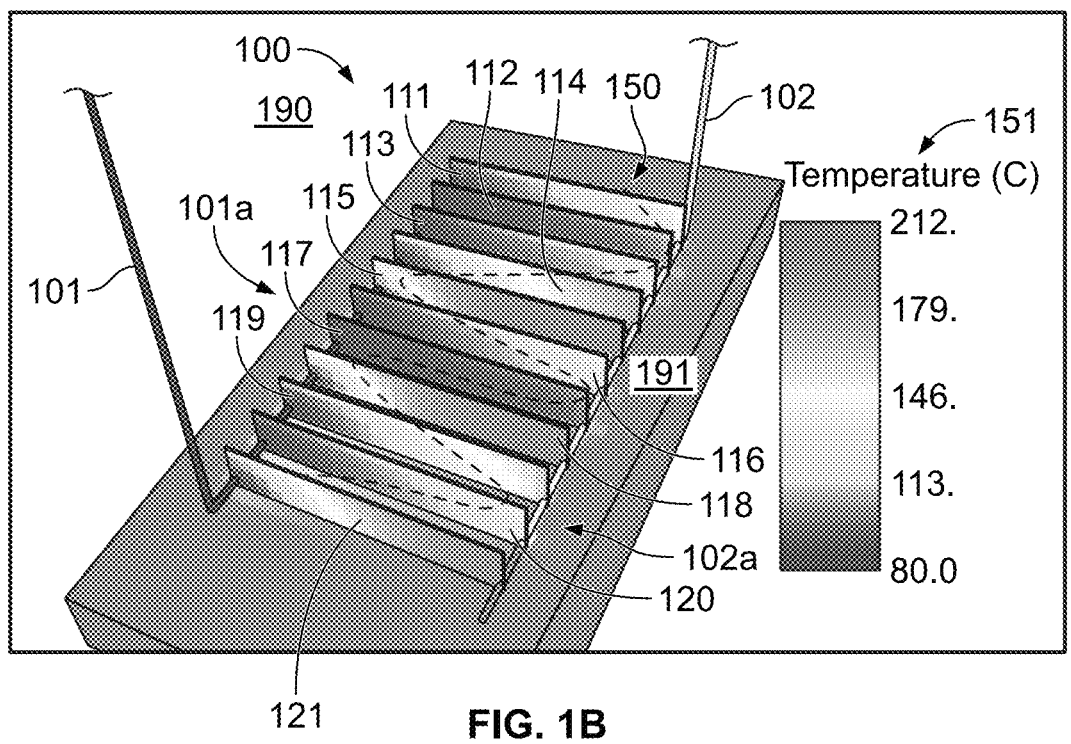
FIG. 1B is a schematic perspective view of the embodiment of the geothermal system of FIG. 1B showing a thermal front.

Thus, turning to FIGS. 1A and 1B there is shown a schematic of fractures along a horizontal producing section of a borehole, having a heterogenous aperture and permeability distribution, which has not been optimized by a preferred embodiment of the present inventions. Turning to FIG. 1A, there is shown a prospective schematic representation of a geothermal system 100 having an injection well 101 and a production well 102. Each having production zones 101a, and 102a, respectively, which are horizontal. A fluid is injected down well 101 into the formation 190, which has a pay zone 191 having high temperature rock. A series of fractures (schematically represented by shaded rectangles 111, 112, 113, 114, 115, 116, 117, 118, 119, 120, 121) provide a fluid connection, e.g., fluid communication, fluid conductivity, between the injection well 101 and the production well 102. In this manner the fluid flows down the injection well 101 through the fractures, where it is heated, and into the production well 102. The heated fluid then flows up production well 102 to the surface where thermal recovery and electrical energy generation equipment (not show) use the recovered thermal energy to generate electricity. The shading of the graph 150 corresponds to the shading of the rectangles 111, et. seq., and illustrates their various aperture sizes.

Turning to FIG. 1B, the same geothermal system 100, as shown in FIG. 1A is depicted, except in this figure the shading illustrates the temperature of the formation and the fluid as it moves through the fractures. Thus, because of the heterogenous nature of the fractures, the temperature profile, or front, (shown by dashed line 150), is non-uniform, not even, and not linear or straight. This non-uniformity results in uneven remove of heat, causing thermal breakthrough, and other deleterious conditions, that shorten the life of the geothermal system, and adversely affect the economics and efficiency of the production of electricity by the system.

Figure 1C:
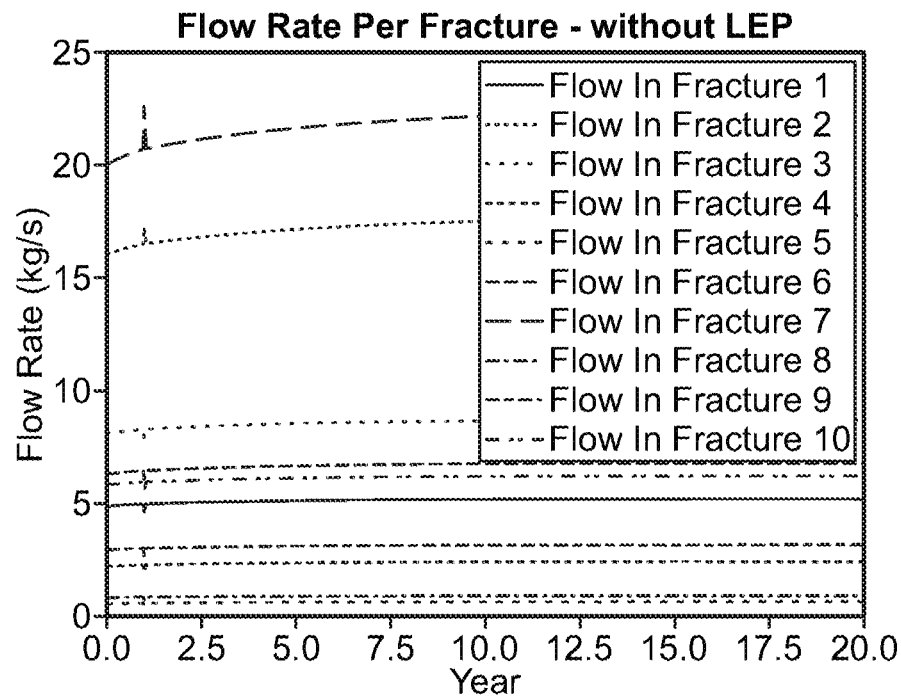
FIG. 1C is a chart showing flow rate for fractures in an embodiment of a system in accordance with the present inventions.
Figure 1D:
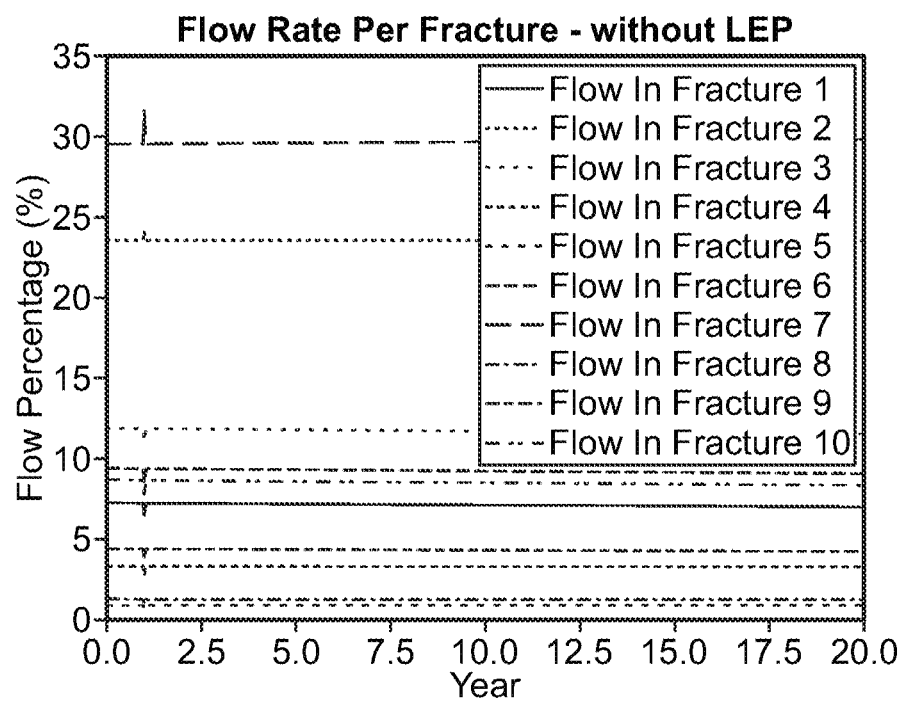
FIG. 1D is a chart showing relative flow rates for the system of FIG. 1C.

FIGS. 1C and 1D show graphs for another geothermal system, which has not been optimized by a preferred embodiment of the present inventions. This system, as did the system of FIGS. 1A and 1B has a series of fractures (ten for the system of FIGS. 1C and 1D) that have a heterogenous distribution and flow properties. FIG. 1C shows the individual flow rates for each fracture, and FIG. 1D shows the relative flow rates for each fracture as a percentage of the total flow across the pay zone between the injection well and production well. These flow rates will result in an uneven and non-uniform flow profile and thermal front, and the resulting detrimental effects caused by these.

Through embodiments of the optimization of perforations, stages and stage features, hydraulic fracturing and proppant use, and combinations and variations of this, a substantially uniform, and preferably even flow distribution, and temperature profile, across the production section, and thus thermal energy recovery, can be obtained and maintained in a geothermal system. Obtaining this flow and temperature profile across the production section can be maintained for 1 to 20 years and longer. This flow across the production zone provides one or more, and in embodiments all of the following advantages and benefits: (i) enables the above ground systems to be built to, or specified for, a specific and predetermined flow and temperature of the heated fluid provided by the production well; (ii) the geothermal system can maintain this specific and predetermined flow and temperature of the heated fluid for extended periods of time, e.g., 2 to 20 years, 5 to 20 years, more than 10 years, 20 years and more, and combinations and variations of these; (iii) it provides for greater predictability in managing the flow of the fluid and to modify or intervene the downhole wellbore and fracture connections to improve flow distribution over time; (iv) it prevents thermal breakthrough; (v) it increases the efficacy of the heat extraction and the overall geothermal system; (vi) it extends the operable life of the geothermal system; and, (vii) it avoids costly rebuilds or system changes to address declines in thermal energy being recovered from the production well, e.g., temperature of the fluid declining over time; to name a few.

Figure 2A:
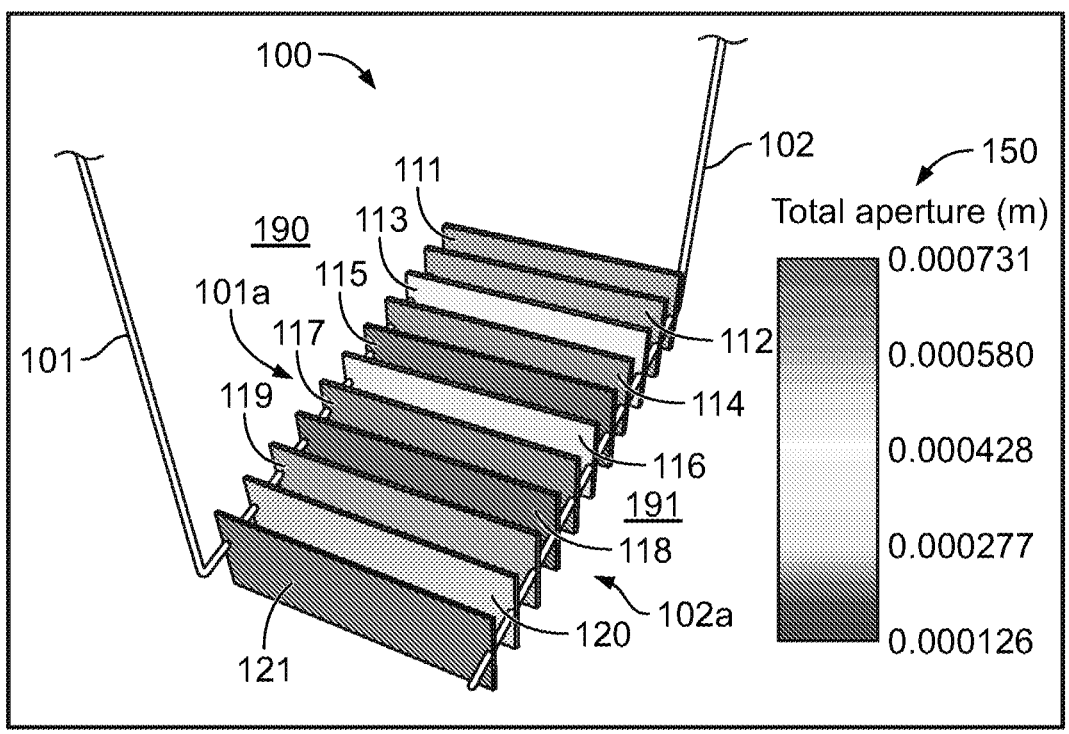
FIG. 2A is a schematic perspective view of an embodiment of a geothermal system using limited entry perforation in accordance with the present inventions, showing aperture size of the fractures.
Figure 2B:
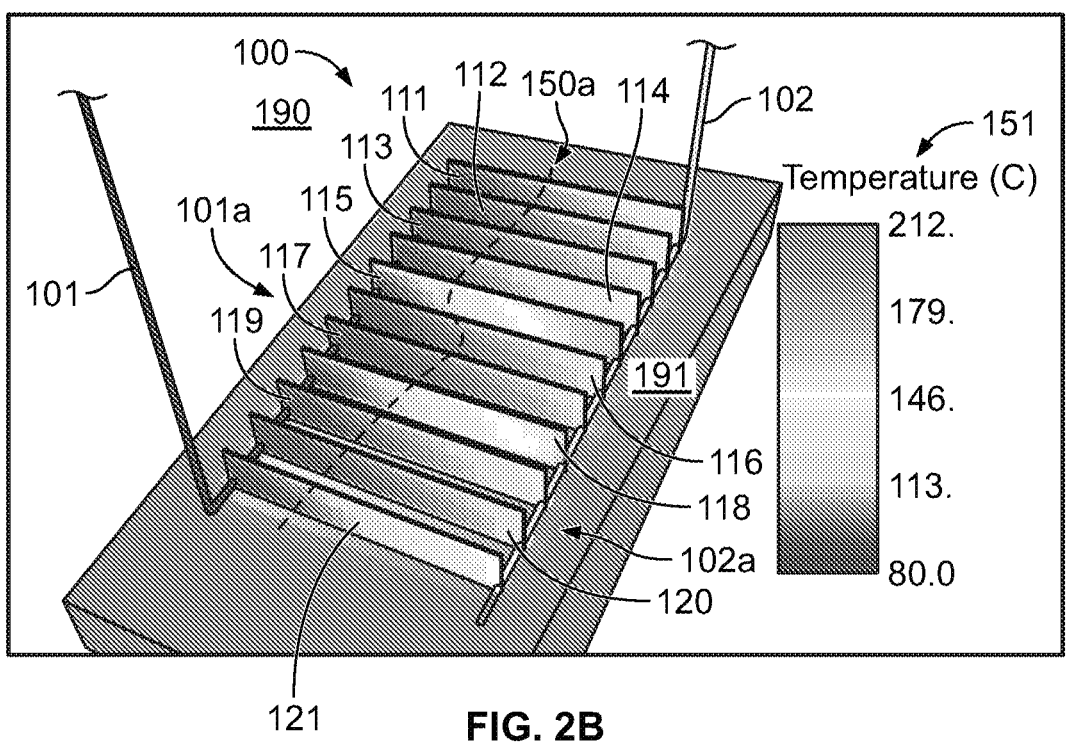
FIG. 2B is a schematic perspective view of the embodiment of the geothermal system of FIG. 1B showing a thermal front.

Turning to FIGS. 2A and 2B there is shown a schematic of the geothermal system of FIG. 1A, except in this embodiment the flow profile along the production section has been optimized to provide a uniform flow and temperature profile 150a through the pay zone 191, along the entire length of production zones 101a, 102a. Thus, FIG. 2B shows a uniform temperature front 150a for the geothermal system 100. It is noted that the aperture area for each of the fractures is still heterogeneous, and has the same heterogeneity as in the embodiment of FIGS. 1A and 1B. However, the flow and temperature profile 150a across the pay zone in FIG. 2B is even, and substantially different from, and improved over the unoptimized flow and temperature profile 150 of FIG. 1B. An embodiment of this type of optimization to the system is referred to a limited entry perforation ("LEP"), e.g., where the configuration of perforations is used to correct and optimize flow characteristics.

Figure 2C:
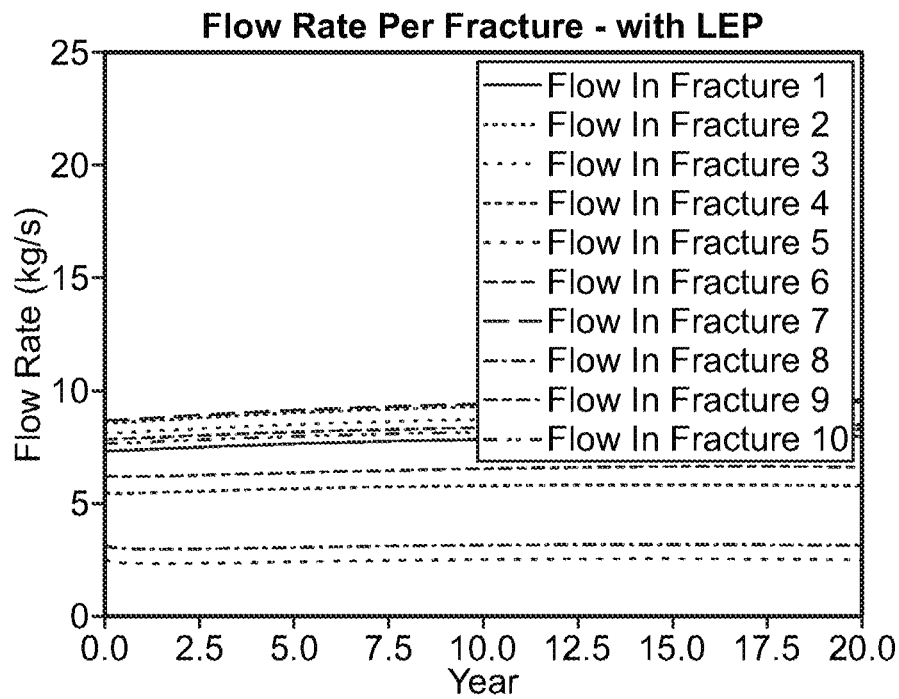
FIG. 2C is a chart showing flow rate for fractures in an embodiment of a system using limited entry perforation in accordance with the present inventions.
Figure 2D:
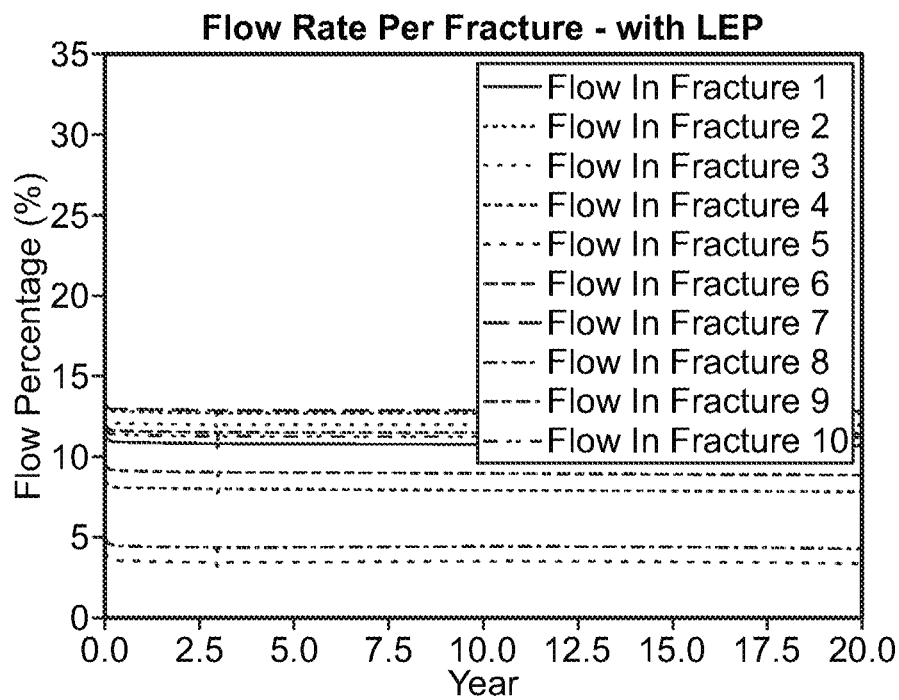
FIG. 2D is a chart showing relative flow rates for the system of FIG. 2C.

Turning to FIGS. 2C and 2D there is shown graphs for another geothermal system, which has been optimized by an LEP embodiment of the present inventions. This system, as did the system of FIGS. 2A and 2B has a series of fractures (ten for the system of FIGS. 2C and 2D) that have a heterogenous distribution and flow properties. However, because the wells were built using LEP the actual flows across these fractures is very uniform. FIG. 2C shows the individual flow rates for each fracture, and FIG. 2D shows the relative flow rates for each fracture as a percentage of the total flow across the pay zone between the injection well and production well. For this LEP geothermal system the individual flow rates across all of the fractures has a difference of less than 10%. (Put another way, the difference in flow between all of the fractures in the production zone is less than 10%.).

In an embodiment, even flow in fractures to improve thermal sweep efficiency and mitigate thermal breakthrough is achieved based on the limited entry effect ("LEP"). This embodiment is directed at a system consisting of one well connected hydraulically by fractures to one or more offset wells, e.g., production wells, where an objective is to recover and produce thermal energy from a subsurface formation. The limited entry perforation pressure drop in the injection well is calculated based on the flow rates expected during long-term fluid circulation through the system; the perforation clusters are designed to achieve a limited entry effect that results in even flow distribution over all fracture zones, regardless of heterogeneity in transmissivity of each fracture zone. The rate of propagation of the thermal front within each fracture zone is dominated by the fluid mass flow rate through each zone, therefore even distribution of flow will result in a controlled thermal front propagation.

In an embodiment, proppants are used to promote and maintain uniform aperture distribution among the hydraulic fractures. In embodiments the proppants can have a size, (diameter or longest cross section) of from about 30 mesh to about 200 mesh, 40 mesh, 40/60 mesh, 70 mesh, 70/100 mesh, 100 mesh, 100/150 mesh, 200 mesh, 200/220 mesh, 250 mesh, 250/260 mesh, and combinations and variations of these. The term "microproppants" as used herein means any proppant that has a size smaller than 100 mesh, i.e., sub-100 mesh, and includes 200 mesh, 300 mesh and finer proppants. These proppants are used to promote uniform aperture distribution among a set of fractures connecting two or more wellbores (e.g., injection and production wells). Proppant is injected as a slurry of water, chemicals, and proppant material during the stimulation treatment. The pressure from the hydraulic fluid opens up, e.g., fractures, the formation. As the pressure is reduced and the fractures close, a proppant pack is formed, keeping the fractures open, and allowing for improved flow conditions to be maintained for a significant period of time following the stimulation treatment. The use of proppant promotes a uniform distribution of fracture aperture and permeability, resulting in improved, optimized, controlled, and combinations and variations of these, thermal front propagation.

As used herein, unless specified otherwise, mesh size and mesh can be corresponded to the relative diameters as set forth in Table 1. As used herein, unless specified otherwise: if particles are described as having a mesh size of "A" it means that the particles will pass through that mess, but will be stopped by a smaller mesh size; if particles are described as having a mesh size of + (plus) mesh "A" it means that the particles will sit upon (e.g., be stopped by) the mesh "A" screen or sieve; and, if particles are described as being − (minus) mesh "A" it means that the particles will pass through (e.g., not be stopped by) the mesh "A" screen or sieve. When particle sizes, for a sample of proppants (a few 100 proppants, to thousands of proppants, to millions of proppants, to tons of proppants) are described as "A"/"B", "A" denotes the largest size of the distribution of sizes, and "B" denotes the smallest size of the distribution of sizes. Thus, a sample of proppants being characterized as mesh 20/40 would have proppants that will pass through a 20 mesh sieve, but will not pass through (i.e., are caught by, sit a top) a 40 mesh sieve.

TABLE 1

| U.S. Mesh (i.e., mesh) | Inches | Microns (μm) | Millimeters (mm) |
|---|---|---|---|
| 3 | 0.2650 | 6730 | 6.730 |
| 4 | 0.1870 | 4760 | 4.760 |
| 5 | 0.1570 | 4000 | 4.000 |
| 6 | 0.1320 | 3360 | 3.360 |
| 7 | 0.1110 | 2830 | 2.830 |
| 8 | 0.0937 | 2380 | 2.380 |
| 10 | 0.0787 | 2000 | 2.000 |
| 12 | 0.0661 | 1680 | 1.680 |
| 14 | 0.0555 | 1410 | 1.410 |
| 16 | 0.0469 | 1190 | 1.190 |
| 18 | 0.0394 | 1000 | 1.000 |
| 20 | 0.0331 | 841 | 0.841 |
| 25 | 0.0280 | 707 | 0.707 |
| 30 | 0.0232 | 595 | 0.595 |
| 35 | 0.0197 | 500 | 0.500 |
| 40 | 0.0165 | 400 | 0.400 |
| 45 | 0.0138 | 354 | 0.354 |
| 50 | 0.0117 | 297 | 0.297 |
| 60 | 0.0098 | 250 | 0.250 |
| 70 | 0.0083 | 210 | 0.210 |
| 80 | 0.0070 | 177 | 0.177 |
| 100 | 0.0059 | 149 | 0.149 |
| 120 | 0.0049 | 125 | 0.125 |
| 140 | 0.0041 | 105 | 0.105 |
| 170 | 0.0035 | 88 | 0.088 |
| 200 | 0.0029 | 74 | 0.074 |
| 230 | 0.0024 | 63 | 0.063 |
| 270 | 0.0021 | 53 | 0.053 |
| 325 | 0.0017 | 44 | 0.044 |
| 400 | 0.0015 | 37 | 0.037 |

Generally, the proppants can be any material synthetic or natural that can withstand the pressure, temperature and other downhole conditions of the well. The proppants can be any volumetric shape, for example, balls, spheres, squares, prolate spheroids, ellipsoids, spheroids, eggs, cones, rods, boxes, multifaceted structures, and polyhedrons (e.g., dodecahedron, icosidodecahedron, rhombic triacontahedron, and prism), as well as, other structures or shapes.

Spherical type structures are examples of a preferred shape for proppants. Sphere and spherical shall mean, and include unless expressly stated otherwise, any structure that has at least about 90% of its total volume within a "perfect sphere," i.e., all points along the surface of the structure have radii of equal distance. A "spherical type" structure shall mean, and include all spheres, and any other structure having at least about 70% of its total volume within a perfect sphere.

The proppants can be any of the sizes set forth on Table 1, as well as, all sizes within the range of that Table, and larger and smaller sizes as well.

Figure 3A:
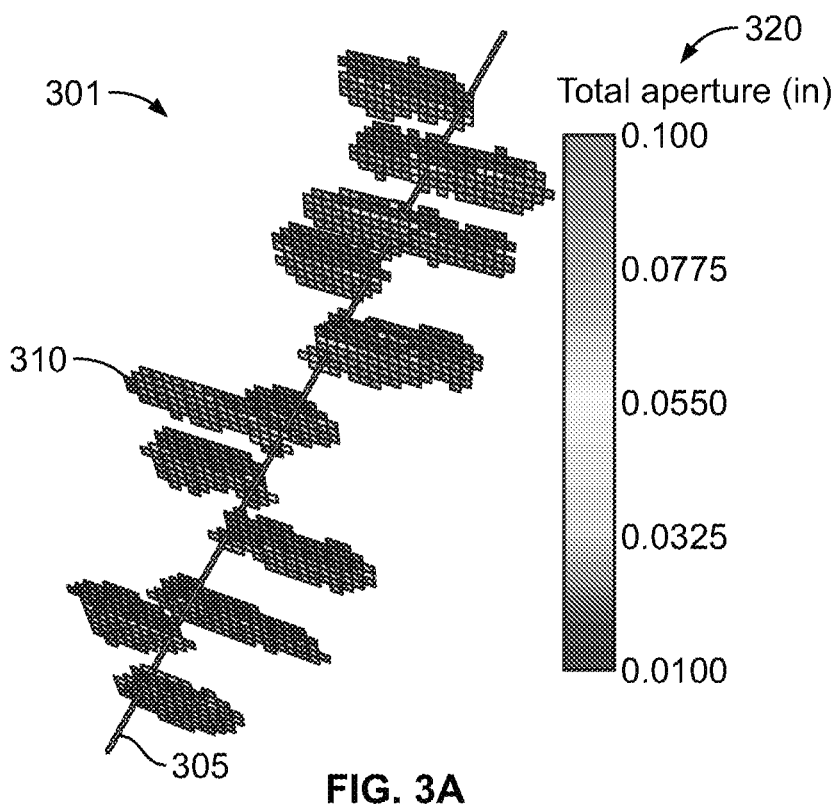
FIG. 3A is a schematic perspective view of a geothermal system in accordance with the present inventions showing aperture size.
Figure 3B:
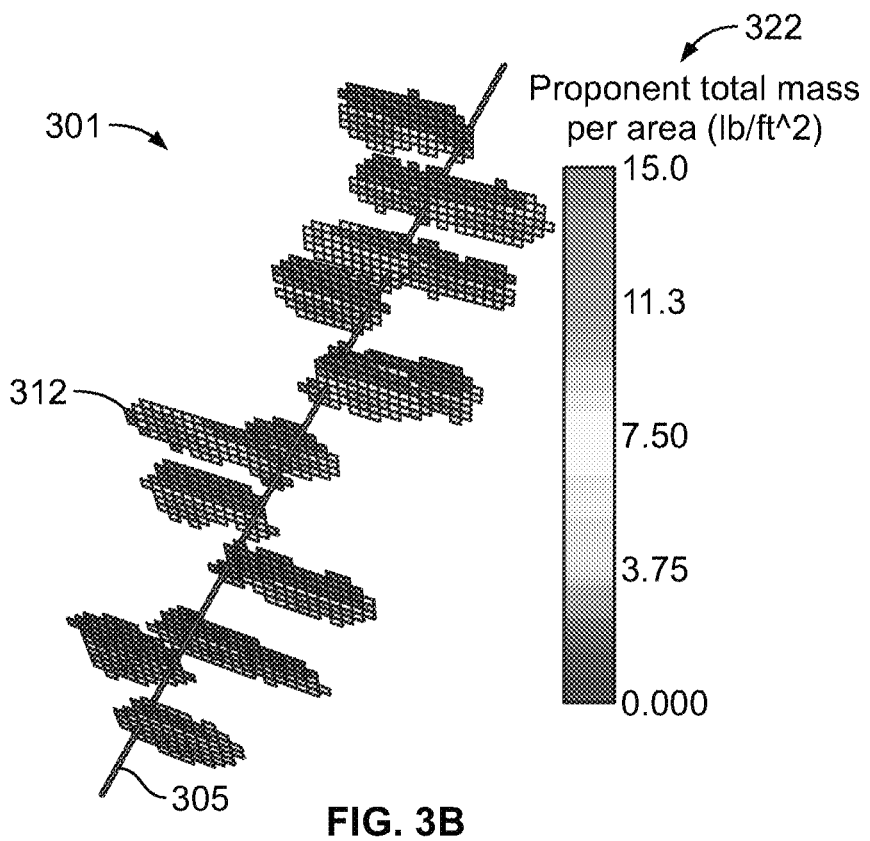
FIG. 3B is a schematic perspective view of the system of FIG. 3A showing proppant mass distribution.

Turning to FIGS. 3A and 3B there is provided a prospective schematic view of a geothermal system 301, which has not been optimized by a preferred embodiment of the present inventions. In FIG. 3A the fractures, e.g., 310, are located along the length of injection well 305. The grey scale of the fractures corresponds to the grey scale of the bar chart 320, providing the total aperture size in inches for the fractures. Bar chart 320 is in units of inches. The proppant is 100 mesh. The formation has a matrix permeability of 0.1 millidarcy ("md").

In FIG. 3B, the mass distribution of the proppant in the fractures is shown by the grey scale for the fractures, e.g., 312, corresponding to bar chart 322. Bar chart 322 is in units of total mass per area (lbs/ft$^2$). In this embodiment the settling effect of the proppant (e.g., much greater mass per area on the lower sides, or bottom, of the fractures) is observable. This settling effect can further significantly affect the fracture aperture distribution, in an adverse manner. In geothermal wells, this settling effect generally has two primary negative consequences: (i) flow is constricted to a relatively small portion of the overall fracture, creating much higher flowing velocities and therefore cooling the system faster; and, (ii) providing relatively small heat transfer surface area for heat conduction from the rock surrounding the fracture to flow into the fluid being advected within the fracture, which leads to faster cooling.

Thus, FIG. 3B provides an illustration of an embodiment of a set of fractures created during hydraulic stimulation treatment. The distribution of fracture aperture and proppant density are shown. This example demonstrates behavior for a case where 100 mesh proppant is used during the stimulation treatment (injected at a concentration of 3 pounds/gal at 80 barrels per minute) in a low-permeability formation according to the prior art. The proppant settling effect causes a significant portion of the fracture to close reducing the effectiveness of the stimulation.

Figure 4A:
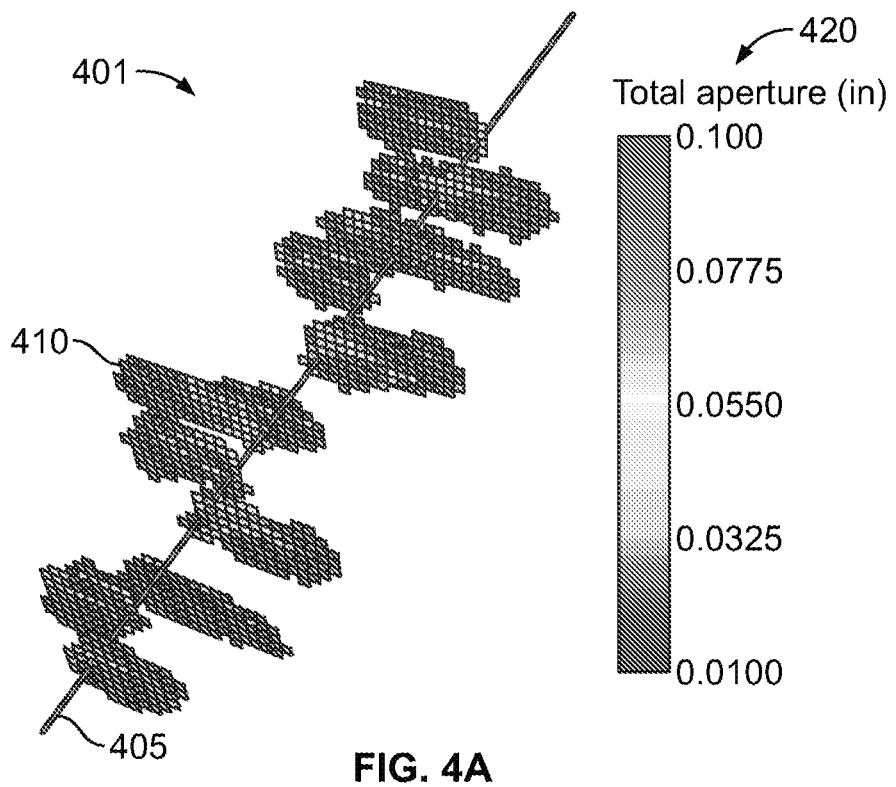
FIG. 4A is a schematic perspective view of a geothermal system in accordance with the present inventions showing aperture size.
Figure 4B:
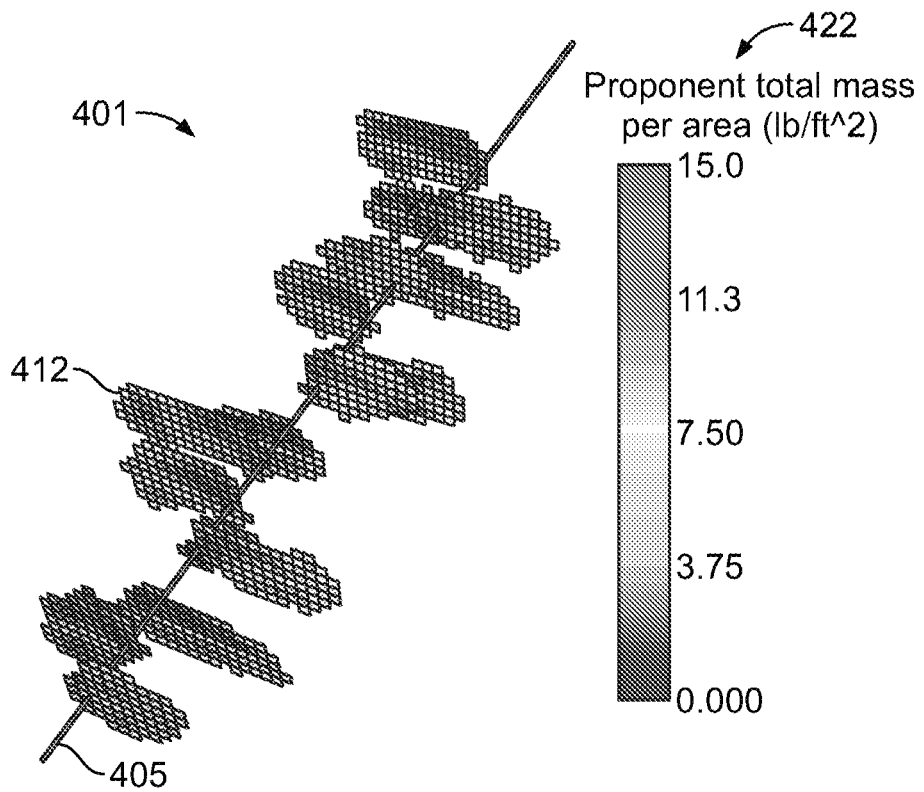
FIG. 4B is a schematic perspective view of the system of FIG. 4A showing microproppant mass distribution.

Turning to FIGS. 4A and 4B there is provided a prospective schematic view of a geothermal system 401, which has been optimized by a preferred embodiment of the present inventions. In FIG. 5A the fractures, e.g., 410, are located along the length of injection well 405. The grey scale of the fractures corresponds to the grey scale of the bar chart 420, providing the total aperture size in inches for the fractures. Bar chart 420 is in units of inches. The proppant is 200 mesh, and thus is considered a microproppant. The formation has a matrix permeability of 0.1 md. In FIG. 4B, the mass distribution of the proppant is shown by the grey scale for the fractures, e.g., 412, corresponding to bar chart 422. Bar chart 422 is in units of total mass per area (lbs/ft$^2$). In this embodiment the settling effect of the proppant is greatly reduced by the use of a microproppant. Further, the use of the microproppant provides improved distribution of fracture aperture (compared to the distribution of FIG. 4A)

Thus, FIG. 4B provides an illustration of an embodiment of a set of fractures created during hydraulic stimulation treatment. The distribution of fracture aperture and proppant density are shown. This example demonstrates behavior for a case where 200 mesh proppant is used during the stimulation treatment (injected at a concentration of 3 pounds/gal at 80 barrels per minute) in a low-permeability formation according to the present invention. The use of microproppant inhibits the proppant settling effect, resulting in a more even and full distribution of proppant at the end of the treatment.

In an embodiment, fracture spacing is designed to improve thermal sweep efficiency and mitigate thermal breakthrough. Fracture spacing influences heat mining efficiency; fracture half-spacing should be equal to the characteristic distance of investigation of a temperature transient for a characteristic time equal to the project lifetime. However, reducing fracture spacing (or increasing the fracture intensity) can result in a reduction in the mass flow rate within each fracture, which can have a positive impact on thermal sustainability.

In an embodiment, the initial wellbore completion program is designed to incorporate subsequent refracturing to improve thermal sweep efficiency. Uneven fracture spacing is utilized in the initial hydraulic stimulation treatment. The spacing is such that much of the unfractured rock remains at ambient temperature conditions up until the point at which refracturing is required. The refracturing treatment targets the zones that have remained hot. The fracture zones stimulated originally may or may not be isolated following the refracturing treatment.

The commercial viability of a geothermal power system depends on, among other things, the long-term thermal sustainability of the reservoir. Thermal energy recovery efficiency is defined as the amount of heat recovered over the lifetime of a project relative to the initial amount of heat in place. Thermal breakthrough is defined as the time at which the temperature of the produced fluid has dropped by a threshold amount, which is controlled by the rate at which the thermal front propagates through the reservoir. Embodiments of the present invention relates to methods to design geothermal reservoir systems to control heat recovery efficiency and to mitigate thermal breakthrough to improve the system's thermal sustainability, among other things.

Heat recovery from a geothermal resource is influenced both by heat conduction in relatively impermeable rocks and advection of heat that is carried within fluid flowing through fractures. Geothermal reservoir management strategies commonly involve reinjecting fluid for the purposes of maintaining reservoir fluid pressures (and therefore minimizing declines in production flow rates) and for improving heat sweep efficiencies. Generally, the reinjection wells are connected hydraulically with the nearby production wells to achieve the beneficial effects of reinjection. However, a common challenge, both in conventional hydrothermal settings and enhanced geothermal systems, is that fluid that is reinjected can tend to concentrate along high-permeable channels, thereby causing early or premature breakthrough. Early breakthrough can have negative consequences, most notably by causing significant declines in production fluid temperature and energy content. Moreover, once a strong flow channel develops, other less permeable channels are bypassed, resulting in suboptimal heat sweep of the subsurface reservoir. Subsurface porous and fractured media is inherently heterogeneous, therefore variability in the permeability of flow channels is common. In oil and gas settings, similar negative consequences related to early breakthrough have been documented in water flooding projects, enhanced oil recovery projects, and steam-assisted gravity drainage projects. Therefore, a challenge and long standing problem in geothermal reservoir engineering is the ability to create a strong hydraulic connection between injection and production wells while at the same time ensuring that early breakthrough effects are minimized. Embodiment of the present invention address, mitigate and overcome this long standing problem.

Limited Entry Perforation Techniques

Objectives of perforating a lengthy cased-and-cemented wellbore section for fracture stimulation are, among other things, to enable extensive communication with the reservoir and control the allocation of fluid and proppant into multiple intervals as efficiently as possible during fracturing treatments. Simultaneously treating multiple intervals reduces the number of fracturing stages required, thus reducing treatment cost. Perforating for hydraulic fracturing normally involves the use of a shaped-charge jet perforator conveyed by a hollow-steel carrier. In horizontal wells, perforating is typically accomplished, for example, by pumping a wireline conveyed, select-fire jet perforating gun string into the lateral section of the well along with a bridge plug. This process is known as "plug-and-perf" and is generally successful in establishing adequate connections from the perforations to the hydraulic fractures."

Due to variability in the rock strength properties at different points along the wellbore, the pressure required to initiate and/or propagate a fracture may vary across different perforation clusters, even within a single treatment stage. The limited entry technique overcomes this challenge and encourages uniform growth of the fractures created at each perforation cluster during a hydraulic stimulation treatment. The limited entry method takes advantage of a friction pressure drop through an orifice (i.e., the perforations). The Bernoulli theorem provides a theoretical basis for estimating perforation friction pressure drop as a function of the flow rate through the perforation cluster and the perforation cluster design parameters (shape of perforations, number of perforation shots, and size of the perforation holes):

$$\Delta p = \frac{0.808 Q^2 \rho}{C^2 N^2 D^4},$$

where $\Delta p$ is the perforation pressure drop, Q, is the volumetric flow rate through the perforation, $\rho$ is fluid density, C is the coefficient of discharge, N is the number of perforation shots in the cluster, and D is the diameter of the perforations (all parameters are in consistent units).

For example, an embodiment of a treatment stage length would range from 100 ft to 300 ft. Treatment flow rates typically range from about 10 barrels per minute (bpm) up to about 100 bpm. The number of perforation clusters per stage can range from one per stage, 3 per stage, 5 per stage, 9 per stage, 15 per stage, from 2 to 20 per stage, and combinations and variations of these as well as higher numbers. This provides cluster or fracture spacing on the order of 10 ft to 100 ft. Proppant concentrations typically range from 1 to 3 pounds of proppant per gallon of fluid (ppg), larger and smaller concentrations may be utilized. The number of perforation shots per perforation cluster may range from about 4 to 12 (typically around 2 to 4 perforation shots per foot) and combinations and variations of these, as well as larger and smaller numbers. Perforation hole diameter typically ranges, for example, from 0.25 in to 0.5 in, with 0.3 in to 0.4 in being typical.

Generally, the perforations and the hydraulic fracturing and stimulation treatments are performed on, or through, the injection wells. The production well in addition to having openings to receive the heated working fluid, may also have hydraulic fracturing and stimulation treatments conducted through it. In embodiments at least one of the wells is hydraulically fractured (typically the injector in the preferred embodiment). The production wells may be openhole, or cased/cemented and fractured.

Perforation Friction Pressure Drop

Many processes can result in uneven flow distribution among a set of fractures intersecting a wellbore, both during hydraulic fracturing and during long-term production operations. These processes are usually caused by heterogeneity in rock properties. For example, variability in the magnitude of the minimum principal stress along the wellbore can cause each perforation cluster interval to experience a different fracture propagation pressure, enabling certain fracture zones to grow more easily and therefore take flow more easily. Variability in the tensile strength or fracture toughness cause by lithology changes or general heterogeneity can have similar effects. During long-term fluid circulation between two wellbores for the purpose of geothermal energy recovery, variability in the fracture aperture can have a significant impact on the flow distribution among multiple fracture zones.

Even in the hypothetical case where fracture flow properties are assumed to be homogeneous, pipe friction pressure losses alone can cause unequal flow distribution. Generally it is theorized that, in some instances, flow tends to concentrate in fractures closest to the heel of the wells (i.e., the first few fractures encountered along the flow path). For a case where the two wellbores have a 7 in wellbore diameter and are connected with a set of 10 fractures, the first fracture receives 36% of the total volumetric flow rate, the second fracture receives 18% of the flow, the third fracture receives 11% of the flow, and the flow distribution continues to decrease for the remainder of the fractures, while the tenth fracture receives roughly 5% of the flow. For cases assuming smaller wellbore diameters, thereby increasing pipe friction pressure effects, the uneven flow distribution can be even more found to be more pronounced.

Embodiments of the limited entry perforation systems address this loss for flow by increasing, preferably in a progressive manner, the number of perforations, the size of the perforations, and combinations and variations of these, as the stages move further from the heel of the well.

Interstage LEP Design

The long standing problems of thermal breakthrough and short circuit are addressed, mitigated and overcome by the use of, among other things, interstage limited entry perforation techniques, which is to design the set of perforation clusters so that they encourage a perforation friction pressure drop sufficient to distribute flow evenly both between a subset of clusters within a single treatment stage (under the flow and wellbore conditions expected during a hydraulic fracture treatment stage) and amongst perforation clusters across multiple stages (under the flow and wellbore conditions expected during long-term operations) and combinations and variations of these.

In a preferred embodiment of the invention, the interstage LEP design would be optimized for a 1500 ft horizontal wellbore divided into 5 treatment stages with 3 perforation clusters per treatment stage. In this case, each stage is 300 ft long, and the perforation cluster spacing (and therefore fracture spacing) is 100 ft. The target maximum fluid injection rate during the hydraulic stimulation treatment is 60 barrels per minute for each stage and the maximum proppant concentration is 3 pounds per gallon. The target fluid injection rate during long-term fluid circulation operations is 100 barrels per minute. The target minimum perforation friction pressure drop during the hydraulic fracture treatment is 1000 psi, and the target minimum perforation friction pressure drop during the long-term fluid circulation phase is 450 psi.

A perforation diameter of 0.325 in is chosen, and the perforation clusters are created with 5 shots per cluster. A perforation shape factor of 0.75 is assumed. In this case, the perforation friction pressure drop during hydraulic fracturing is 6068 psi, and the pressure drop during long-term fluid circulation operations is 522 psi. This design achieves the target minimum friction pressure drop during both the fracturing treatment phase and the long-term fluid circulation phase. This design could be executed relatively simply in practice because each perforation cluster is the same.

Another preferred embodiment of the invention involves optimizing the LEP design for the same conditions as described above. In this case, a perforation diameter of 0.25 in is chosen and a perforation shape factor of 0.75 is assumed. A tapered distribution of perforation shots per cluster is chosen, where the clusters in the stage closest to the toe (Stage 1) each have 7 shots per cluster, Stages 2, 3, and 4 each have 8 shots per cluster, and Stage 5 has 4 shots per cluster, and Stage 5 has 9 shots per cluster. This design results in perforation friction drops for each stage ranging from 459 psi to 758 psi during the hydraulic fracture treatment phase and ranging from 5333 psi to 8816 psi during the long-term fluid circulation phase. This design would tend to encourage more flow to divert toward to stages closer to the toe. The pressure drops are within ranges that can be achieved with typical fracturing pressure pumps.

Real-Time Characterization of Hydraulic Fractures

In an embodiment field tests are performed to determine the injectivity of a hydraulic stimulation treatment stage as a characterization step, for example, for other treatments. In a preferred embodiment the initial step is a pre-characterization steps before a main treatment step, e.g., a hydraulic stimulation, having one, two, three, four or more pumpings. One or more sections, or stages, of the borehole can be isolated using zonal isolation technology. The pre-characterization steps can be carried out on each of these simultaneously or serially.

The pre-characterization tests can involve among other things: a testing procedure to characterize the potential for splay fractures to propagate from the tips of preexisting natural fractures; the potential for propagating fractures to terminate against or propagate through preexisting natural fractures; the potential for other types of fracturing; the potential for conductivity of the reservoir. The pre-characterization tests are used for planning the later stimulation treatment. The process of pre-characterization and stimulation treatment can be repeated multiple times until the desired well, formation, fracture zone properties and conditions are obtained.

In an embodiment the pre-characterization tests are performed on a stage-by-stage basis to characterize heterogeneity in flow properties along the wellbore.

Pre-characterization tests, e.g., a pressure transient test, could involve, among other things: i) a traditional constant rate injection test, ii) a tendency for shear stimulation test, iii) a diagnostic fracture injection test, iv) a step-rate injection test, v) a step-pressure injection test, or vi) some combination thereof.

The pre-characterization step can include performing active measures, e.g., pumping and monitoring; monitoring methods, e.g., seismic, microseismic, distributed well sensors, etc.; and computational, e.g., modeling and analysis of historical data, and combinations and variation of these. Information and data and process that can be used in the pre-characterization test include, for example, analyzing lost circulation zones, analyzing mudlog data, performing wellbore image logs, or performing wireline pressure/temperature/spinner logs.

Figure 12A:
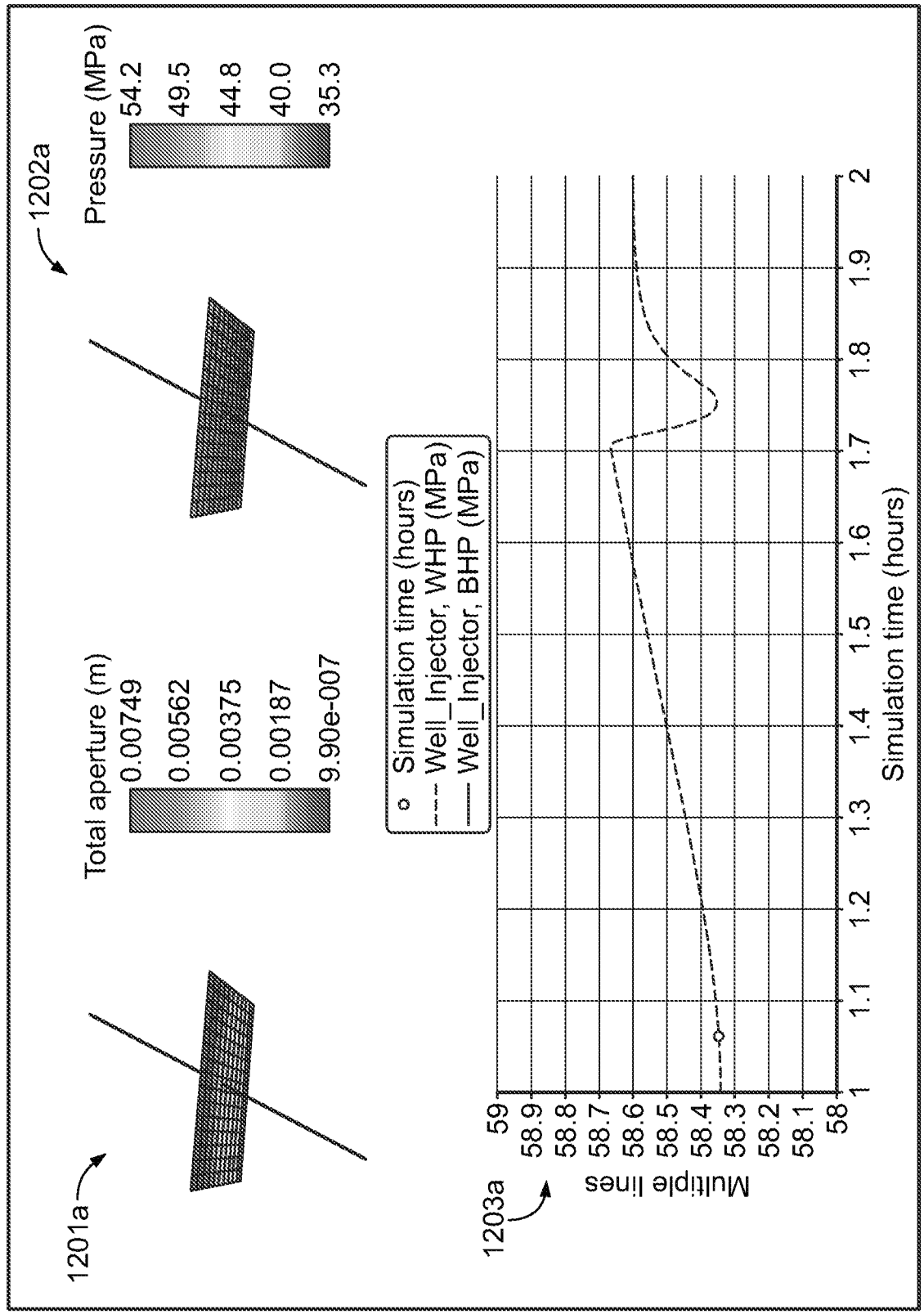
FIGS. 12A to 12D are charts showing the progression of a hydraulic fracture treatment over time, in accordance with the present inventions.

Turning to FIGS. 12A to 12D there are shown a series of charts illustrating the progression of a hydraulic fracture test and the test's effects on the formation and its stress characteristics. In FIG. 12A there is shown at time 1 hour of the stimulation test the distribution of fracture aperture 1201*a*, fracture pressure 1202*a*, and the temporal profile of the well pressure 1203*a*. At this point in the test the natural fracture is beginning to pressurize, but a splay fracture has not yet formed.

Figure 12B:
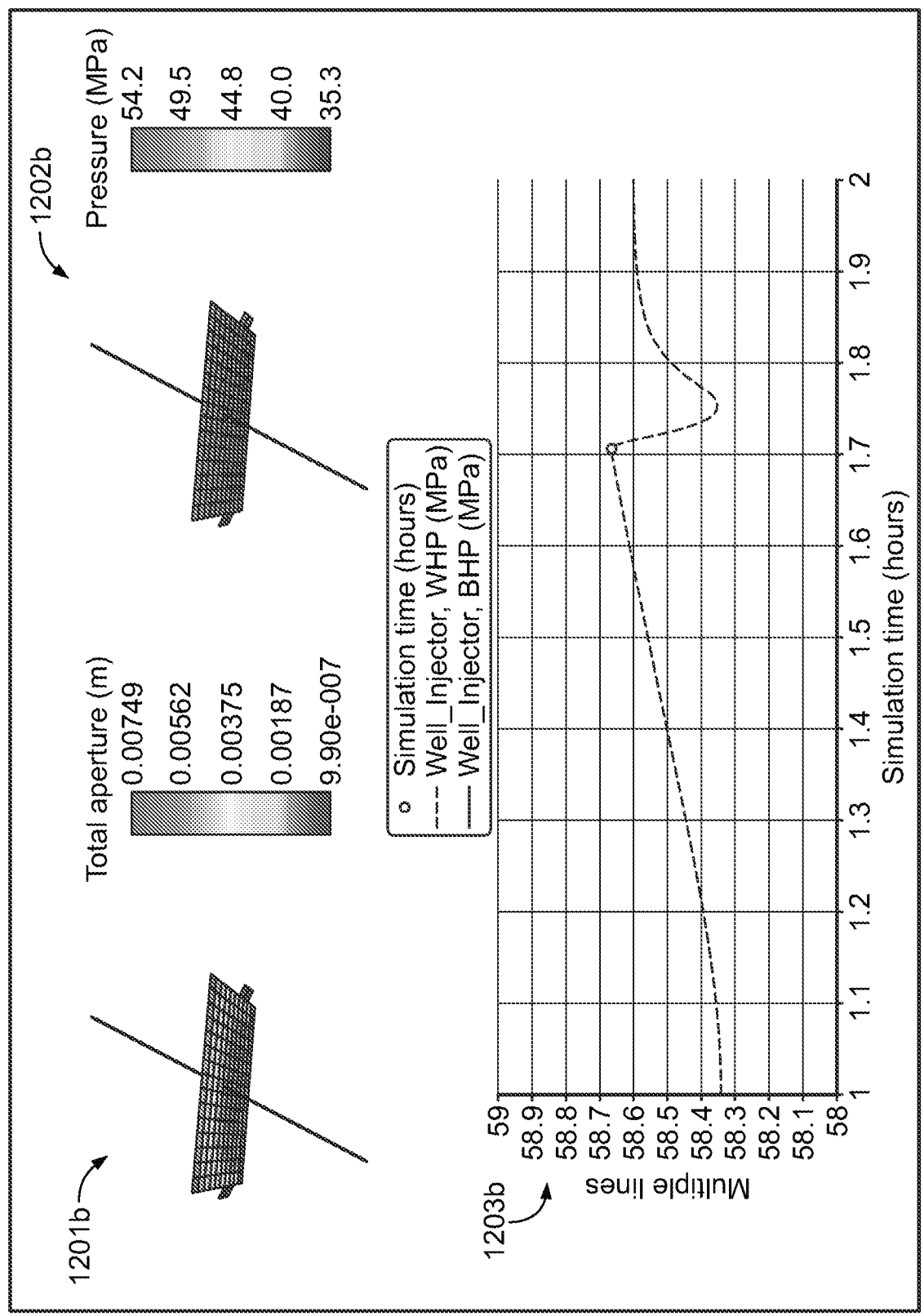

In FIG. 12B there is shown at time ~1.71 hour of the stimulation test the distribution of fracture aperture 1201*b*, fracture pressure 1202*b*, and the temporal profile of the well pressure 1203*b*. At this point in the test the test a splay fracture has initiated, as seen in 1201*b* and 1202*b*.

Figure 12C:
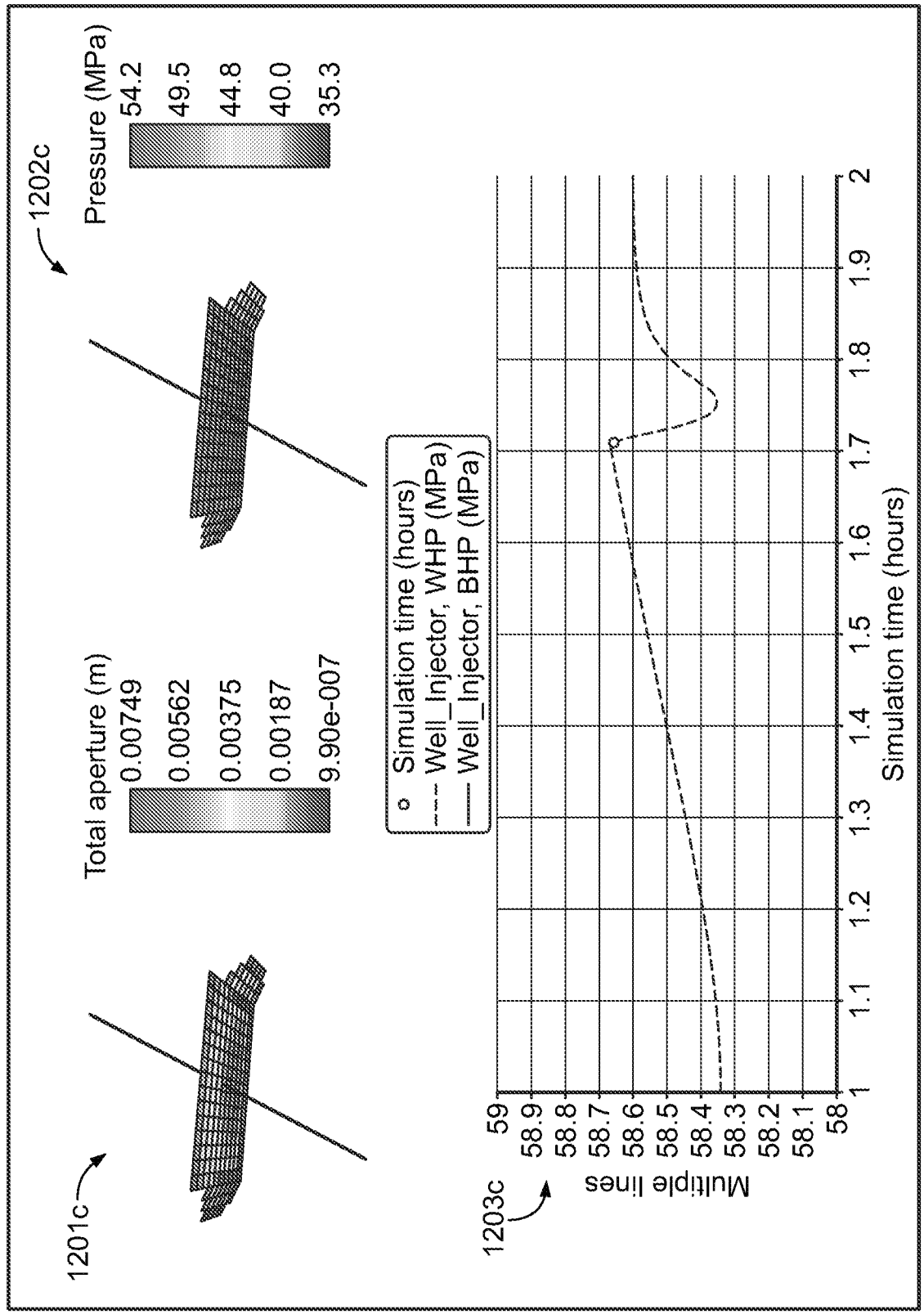

In FIG. 12C there is shown at time ~1.72 hour of the stimulation test the distribution of fracture aperture 1201*c*, fracture pressure 1202*c*, and the temporal profile of the well pressure 1203*c*. At this point in the test the test a splay fracture has initiated and begun propagating, as seen in 1201*c* and 1202*c*. The signature of the splay fracture is detectable at the injection well.

Figure 12D:
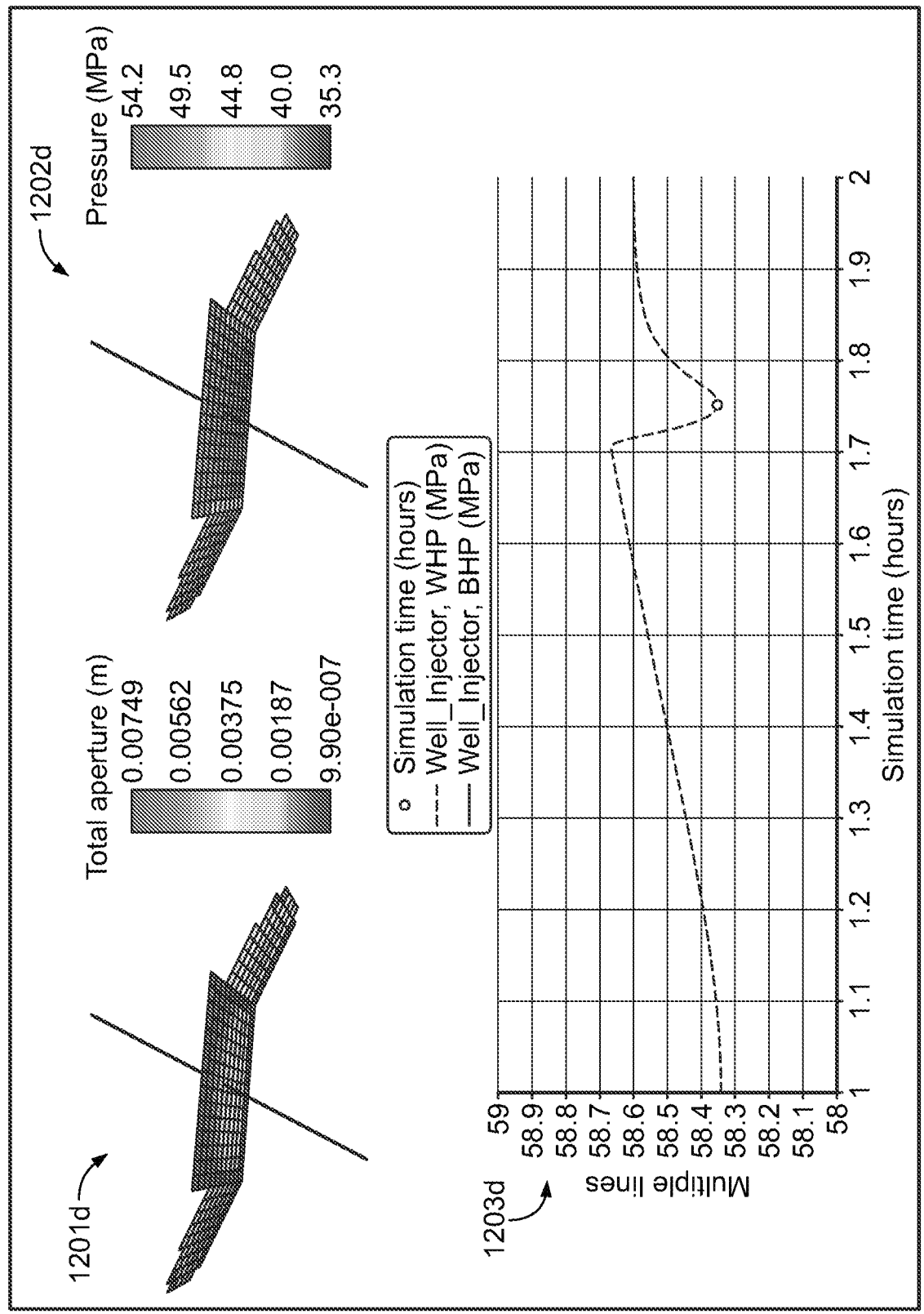

In FIG. 12D there is shown at time 1.75 hour of the stimulation test the distribution of fracture aperture 1201d, fracture pressure 1202d, and the temporal profile of the well pressure 1203d. At this point in the test the test the splay fracture has propagated a significant distance away from the wellbore, as seen in 1201d and 1202d. The signature of the splay fracture is detectable at the wellbore as a pressure drop.

Figure 13:
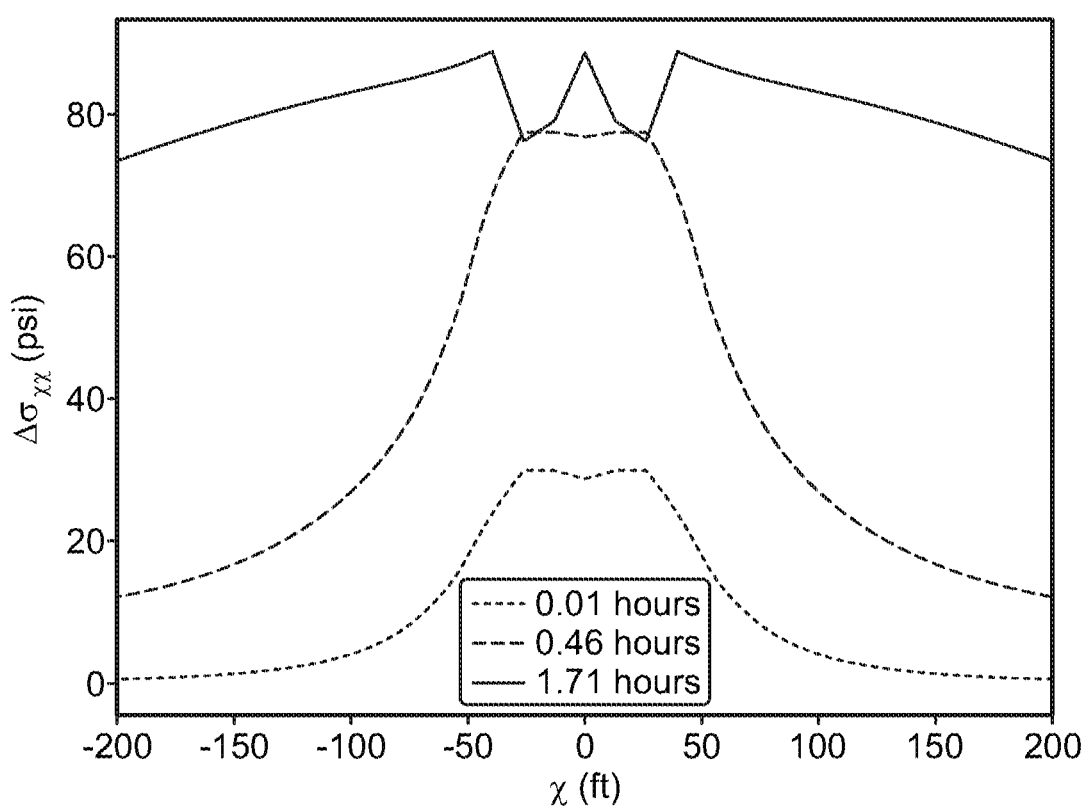
FIG. 13 is a chart comparing stress properties of a formation over time during hydraulic fracturing, in accordance with the present inventions.

Turning to FIG. 13 is a chart showing the profile of induced stress changes caused by the deformation of both the natural fracture and the propagating splay fractures. This stress change profile represents a signal that is detected using, for example, a Distributed Strain Sensing fiber optic cable installed in the injection well. The stress change at early time is caused by deformation of the natural fracture, whereas the stress change at 1.71 hours indicates the initiation and propagation of the splay fracture.

In embodiments the information obtained from pre-characterization tests, such as those illustrated in FIGS. 12 and 13, describe how to detect the influence of natural fractures that are in the vicinity of the wellbore. Cased/cemented well completions in geothermal applications have been discredited by the art because it was thought that the cement will seal off the permeable natural fractures. Embodiments of the present inventions go against this thinking of the prior art. Embodiments of the present inventions can cause hydraulic fractures to propagate away from the wellbore and intersect permeable natural fractures further out in the reservoir. The hydraulic fracture and proppant system create enhanced near-wellbore flow connections to the broader reservoir system. The interaction between hydraulic and natural fractures can be called "mixed-mechanism stimulation."

The interaction of hydraulic fractures, natural fractures, and their combination (e.g., splay fractures) have specific signals (e.g., pressure transient, strain, or stress) that can be used to identify the subsurface behavior. This information can further be used to plan and develop completion and fracturing plans for these specific wells and formations.

Using downhole tests and signals (e.g., pressure transient or strain from distributed fiber optics), a perforation and fracture plan can be developed and implements that improves, and preferably optimizes the perforation cluster location, stage location, and hydraulic fracture treatment parameters based on the expected mixed-mechanism fracturing behavior.

EXAMPLES

The following examples are provided to illustrate various embodiments of systems, processes, compositions, applications and materials of the present inventions. These examples are for illustrative purposes, may be prophetic, and should not be viewed as, and do not otherwise limit the scope of the present inventions.

Example 1

Figure 5:
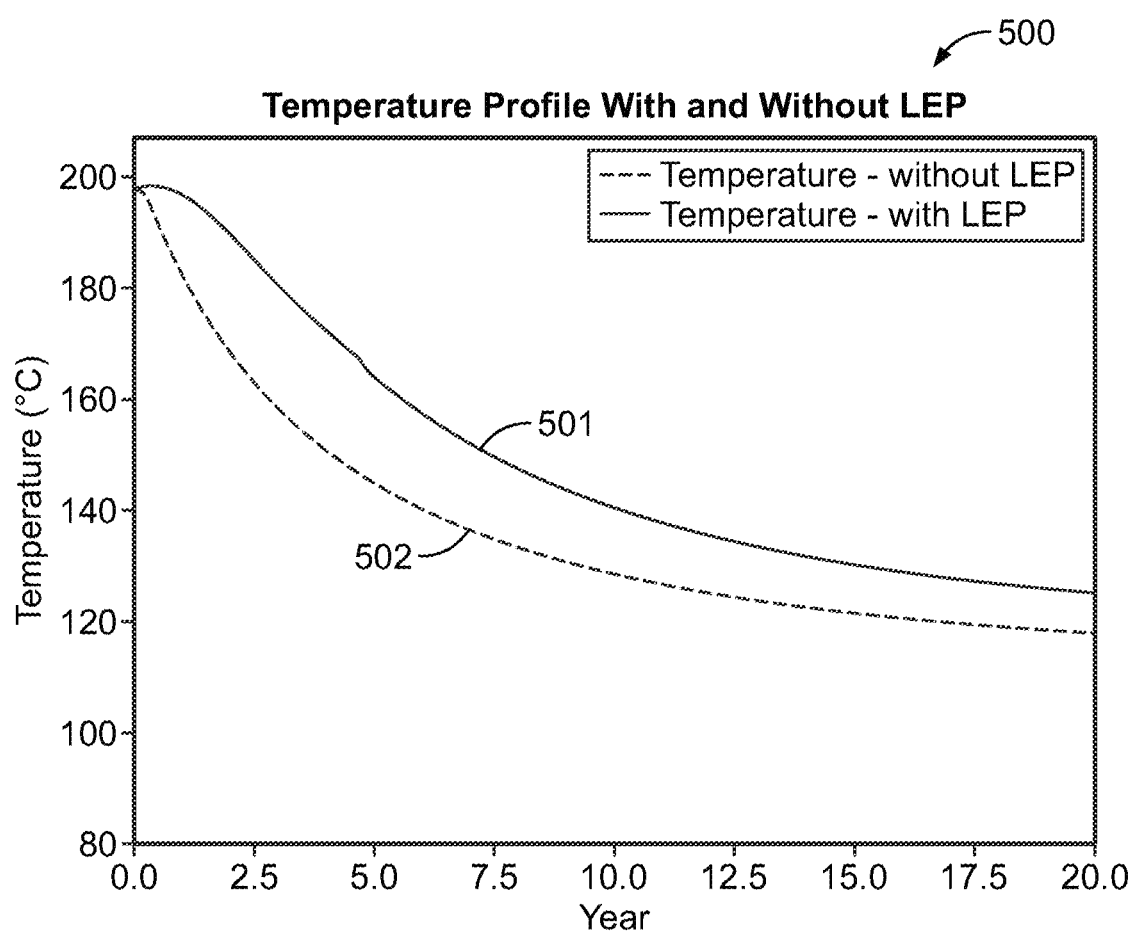
FIG. 5 is a chart a production well temperature for two different wells over a 20-year reservoir lifetime, in accordance with the present inventions.

Turning to FIG. 5, there is provided a graph 500 comparing the temperature profiles 501 of an LEP based geothermal system of the present invention against the temperature profile 502 of a conventional geothermal system, which is not based on LEP, over a 20-year period. For the conventional system, the pressure drop effects exhibits premature thermal breakthrough due to rapid cooling of high-permeability fracture pathways. Thus, as seen in the profile 502, the conventional system can lose about 20° C. over the first 1.25 years (~10% reduction in temperature), and about 35° C. (~18% reduction in temperature). In contrast, the case with active LEP tends to cool significantly slower because flow is distributed more evenly among the set of fractures connecting the injection and production wells. Thus, at year 1.25 the LEP system has a temperature drop if about 2° C. (~1% reduction in temperature); and at year 2.5 the LEP system has a temperature drop of about 13° C. (~7% reduction in temperature).

The case with no LEP pressure drop effects 502 exhibits premature thermal breakthrough due to rapid cooling of high-permeability fracture pathways. In contrast, the case with active LEP 501 cools significantly slower because flow is distributed more evenly among the set of fractures connecting the injection and production wells.

At the 20 year point, the typical end for the lifetime of a geothermal system, the LEP system is still about 5° C. warmer that the convention system, and thus should have additional life beyond the typical 20 period for conventional systems.

Example 2

Figure 6:
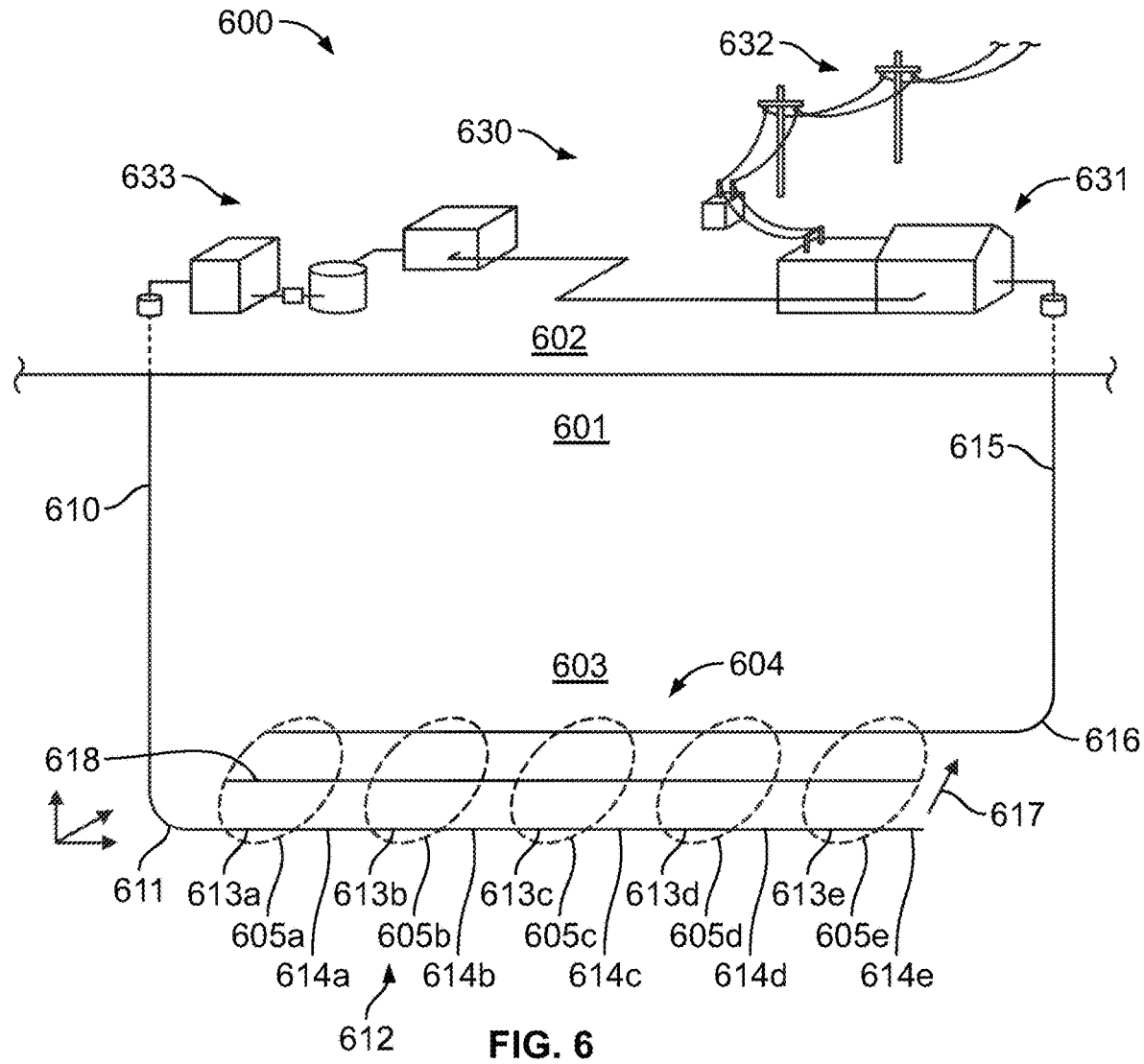
FIG. 6 is a perspective partial cutaway view of a geothermal system in accordance with the present inventions.

Turning to FIG. 6, there is provided a perspective cross sectional view of an embodiment of an LEP geothermal system 600. The system 600 has an injection well 610 and a production well 615. The wells 610, 615 extend from the surface 602 of the earth 601, down into a formation 603, which has a pay zone 604. The injection well 610 has a heel 611 and a horizontal section 612, which is also the producing section. The producing section 612, has stages 613a, 613b, 613c, 613d, 613e. Each of these stages have different configurations of perforations, to address and level out the flow across the pay zone 604. Between the stages, the injection well has non-perforated sections 614a, 614b, 614c, 614d, 614e. The heel 611 is not perforated.

The system 600 has fracture zones 605a, 605b, 605c, 605d, 605e in the pay zone 604, of the formation 603, that provide fluid communication, e.g., flow, between the producing section 612 and the production well 615. One or more, and in embodiments all, of the fracture zones, 605a, etc., have different flow characteristics, e.g., porosity, aperture size, conductivity, permeability, and combinations and variation of these and other factors. The producing well 615 has a heel 616, which is not perforated, and has perforations, or other openings, along its length in the pay zone 604, to receive the heated fluid from the pay zone.

The system has a surface system 630, that has a heat recovery and electricity generation system 631, a transmission system 632, and an injection system 633.

In operation the operating fluid is forced down the injection well 610, and out of the perforations in the stages, 613a etc., and into the fracture zones, 605a etc., where it flows across the pay zone 604. The fluid is heated in the pay zone 604, and then enters into the production well 615, where the heated fluid is transported to the heat recovery and electricity generation system 631 on the surface 602.

As the fluid moves across the pay zone 604, in the direction of arrow 617, the flow across the length of the pay zone 604 (and also across all of the fracture zones, 605a etc.) is even, uniform, substantially linear, and parallel with the injection and production wells, as shown by flow line 618. This flow line 618 also represent the thermal front, which is even, uniform, substantially linear, and parallel with the injection and production wells, for the system.

It is the positions, and number of perforations in each of the stages 613a, etc., that address, mitigate and overcome the uneven flow caused by the heterogeneity of the fractures, and the fracture zones.

Example 2A

In an embodiment of the system of Example 2, the flow rate for each of the stages has a difference from the flow rate of the other stages, that is smaller than about 15%, preferably smaller than about 10% and more preferably smaller than about 5%.

Example 2B

In an embodiment of the system of Example 2, the flow rate across the pay zone has no section where the difference in flow rate from another section: is greater than 15%, preferably greater than 10%, more preferably greater than 7% and still more preferably greater than 5%.

Example 2C

In an embodiment of the system of Example 2, the flow rate for each of the facture zones has a difference from the flow rate of the other fracture zones, that is smaller than 15%, preferably smaller than 10% and more preferably smaller than 5%.

Example 2D

In the embodiments of Examples 2, 2A, 2B, and 2C, the system additionally utilizes proppant having a proppant size of 200/250 mesh. The proppant reduces the heterogeneity of the fracture flow characteristics.

Example 2E

In the embodiments of Examples 2, 2A, 2B, 2C and 2D, the systems show a temperature provide, where in the first 5 years of operation the temperature of the heated fluid recovered from the production well declines less than 5° C. per year, preferably less than 2.5° C. per year, and more preferably less than 1° C. per year.

Example 2F

In the embodiments of Examples 2, 2A, 2B, 2C and 2D, the systems show a temperature provide, where in the first 5 years of operation the temperature of the heated fluid recovered from the production well declines less than 10% per year, preferably less than 5% per year, and more preferably less than 2% C per year.

Example 2G

In the embodiments of Examples 2, 2A, 2B, 2C and 2D, the systems show a temperature provide, where in the first 2 years of operation the temperature of the heated fluid recovered from the production well declines less than 5° C. per year, preferably less than 2.5° C. per year, and more preferably less than 1° C. per year.

Example 2H

In the embodiments of Examples 2, 2A, 2B, 2C and 2D, the systems show a temperature provide, where in the first 2 years of operation the temperature of the heated fluid recovered from the production well declines less than 10% per year, preferably less than 5% per year, and more preferably less than 2% C per year.

Example 21

In the embodiments of Examples 2 and 2A to 2H, the producing section of the well is from 100 to 300 ft, and each stage is about 10% to about 15% of the length of the producing section. The stages have from 2 to about 300 perforations, and for embodiments where clusters are utilized, 900 or more perforations per stage could be utilized.

Example 3

Figure 7:
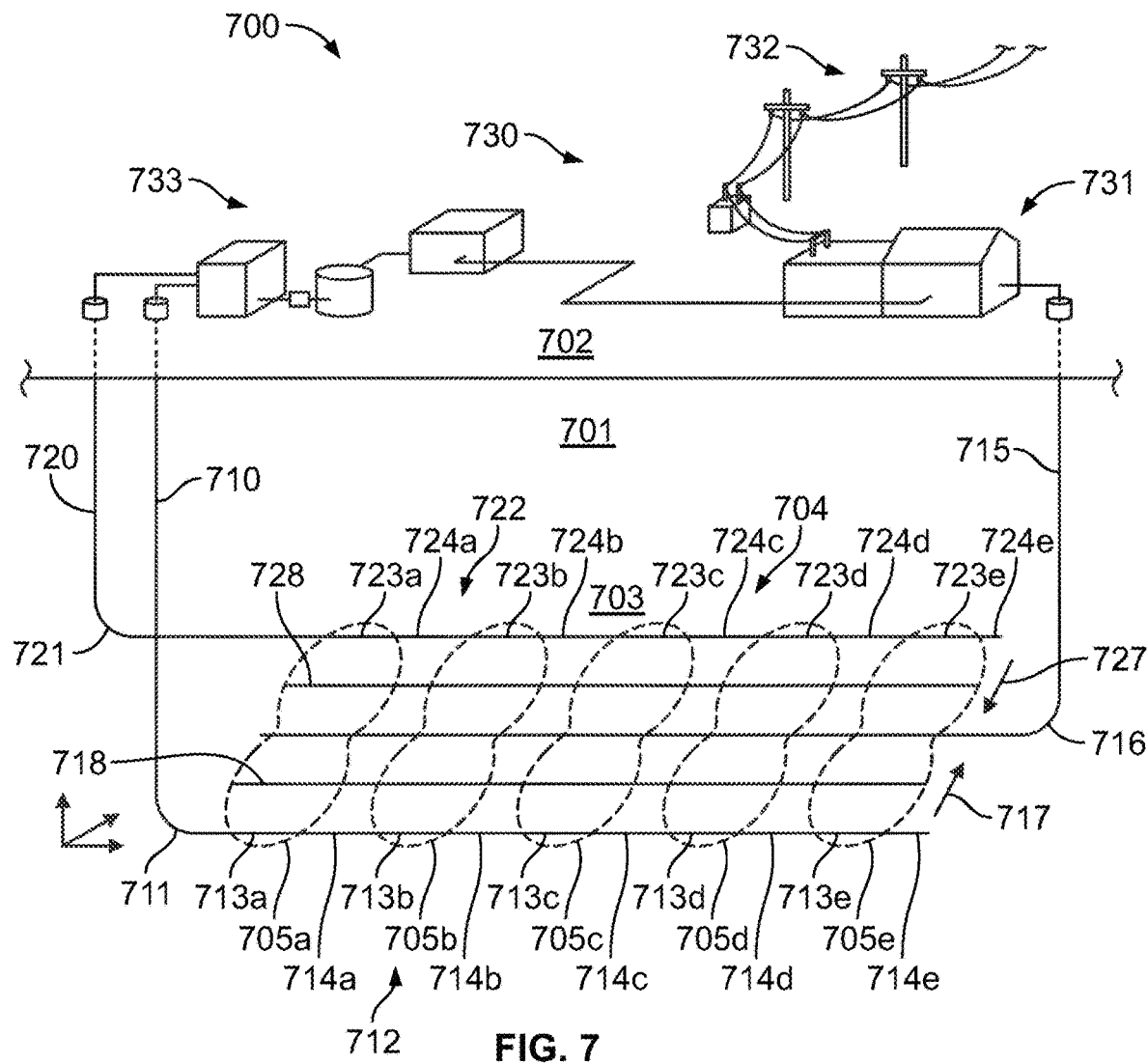
FIG. 7 is a perspective partial cutaway view of a geothermal system in accordance with the present inventions.

Turning to FIG. 7, there is provided a perspective cross sectional view of an embodiment of an LEP geothermal system 700. The system 700 has two injection wells 710, and 720, and a production well 715. The wells 710, 720, 715 extend from the surface 702 of the earth 701, down into a formation 703, which has a pay zone 704. The injection well 710 has a heel 711 and a horizontal section 712, which is also the producing section. The injection well 720 has a heal 721 and a horizontal section 722, which is also the producing section.

The producing section 712, has stages 713a, 713b, 713c, 713d, 713e. Each of these stages have different configurations of perforations, to address and level out the flow across the pay zone 704. Between the stages, the injection well has non-perforated sections 714a, 714b, 714c, 714d, 714e. The heel 711 is not perforated.

The producing section 722, has stages 723a, 723b, 723c, 723d, 723e. Each of these stages have different configurations of perforations, to address and level out the flow across the pay zone 704. Between the stages, the injection well 722 has non-perforated sections 724a, 724b, 724c, 724d, 724e. The heel 721 is not perforated.

The system 700 has fracture zones 705a, 705b, 705c, 705d, 705e in the pay zone 704, of the formation 703, that provide fluid communication, e.g., flow, between the producing section 712 of injection well 710 and the production well 715; and between producing section 722 of injection well 720 and the production well 715.

One or more, and in embodiments all, of the fracture zones, 705a, etc., have different flow characteristics, e.g., porosity, aperture size, conductivity, permeability, and combinations and variation of these and other factors. In addition, in embodiments, the section of the fracture zone adjacent to section 710 can have different flow characteristics from section of the same fracture zone adjacent to section 720.

The producing well 715 has a heel 716, which is not perforated, and has perforations, or other openings, along its length in the pay zone 704, to receive the heated fluid from the pay zone.

The system has a surface system 730, that has a heat recovery and electricity generation system 731, a transmission system 732, and an injection system 733.

In operation the operating fluid is forced down the injection well 710, the injection well 720, and both wells, and out of the perforations in the stages, 713a etc., 723a etc., and into the fracture zones, 705a etc., where it flows across the pay zone 704. The fluid is heated in the pay zone 704, and then enters into the production well 715, where the heated fluid is transported to the heat recovery and electricity generation system 731 on the surface 702.

As the fluid moves across the pay zone 704, in the direction of arrow 717, and arrow 727, the flow across the length of the pay zone 704 (and also across all of the fracture zones, 705a etc.) is even, uniform, substantially linear, and parallel with the injection and production wells, as shown by flow lines 718, 728. These flow lines 718, 728 also represent the thermal front, which is even, uniform, substantially linear, and parallel with the injection and production wells, for the system.

It is the positions, and number of perforations in each of the stages 713a, etc., 723a, etc., that address, mitigate and overcome the uneven flow caused by the heterogeneity of the fractures, and the fracture zones.

Example 3A

In an embodiment of the system of Example 3, the flow rate for each of the stages has a difference from the flow rate of the other stages, that is smaller than about 15%, preferably smaller than about 10% and more preferably smaller than about 5%.

Example 3B

In an embodiment of the system of Example 3, the flow rate across the pay zone has no section where the difference in flow rate from another section: is greater than 15%, preferably greater than 10%, more preferably greater than 7% and still more preferably greater than 5%.

Example 3C

In an embodiment of the system of Example 3, the flow rate for each of the facture zones has a difference from the flow rate of the other fracture zones, that is smaller than 15%, preferably smaller than 10% and more preferably smaller than 5%.

Example 3D

In the embodiments of Examples 3, 3A, 3B, and 3C, the system additionally utilizes proppant having a proppant size of 200/250 mesh. The proppant reduces the heterogeneity of the fracture flow characteristics.

Example 3E

In the embodiments of Examples 3, 3A, 3B, 3C and 3D, the systems show a temperature provide, where in the first 5 years of operation the temperature of the heated fluid recovered from the production well declines less than 5° C. per year, preferably less than 2.5° C. per year, and more preferably less than 1° C. per year.

Example 3F

In the embodiments of Examples 3, 3A, 3B, 3C and 3D, the systems show a temperature provide, where in the first 5 years of operation the temperature of the heated fluid recovered from the production well declines less than 10% per year, preferably less than 5% per year, and more preferably less than 2% C per year.

Example 3G

In the embodiments of Examples 3, 3A, 3B, 3C and 3D, the systems show a temperature provide, where in the first 2 years of operation the temperature of the heated fluid recovered from the production well declines less than 5° C. per year, preferably less than 2.5° C. per year, and more preferably less than 1° C. per year.

Example 3H

In the embodiments of Examples 3, 3A, 3B, 3C and 3D, the systems show a temperature provide, where in the first 2 years of operation the temperature of the heated fluid recovered from the production well declines less than 10% per year, preferably less than 5% per year, and more preferably less than 3% C per year.

Example 3I

In the embodiments of Examples 3 and 3A to 3H, the producing section of the well is from 100 to 300 ft, and each stage is about 10% to about 15% of the length of the producing section. The stages have from 2 to about 300 perforations, and for embodiments where clusters are utilized, 900 or more perforations per stage could be utilized.

Example 4

In the construction of a geothermal energy system. The pay zone between the injection well and the production well is initially fractured. The flow characteristics base upon this initial fracture are determined along the length of the producing section of the well. From this initial fracture information, the number and sizes of stages, and the number, spacing and positioning of perforations, clusters and both, are determined and then implemented. This determination is to provide an injection well producing section that mitigates, the observed heterogenatiy in the initial fractures, and to provide an even flow from all of the stages, and across the pay zone. The testing and then further perfing, fracturing and both can be repeated several times, to reach optimum, e.g., linear, flow characteristics across the fractures and the pay zone. Proppants, preferably microproppants, can be used during this process as well, to reduce the heterogeneity in the fractures themselves.

Example 5

Figure 8:
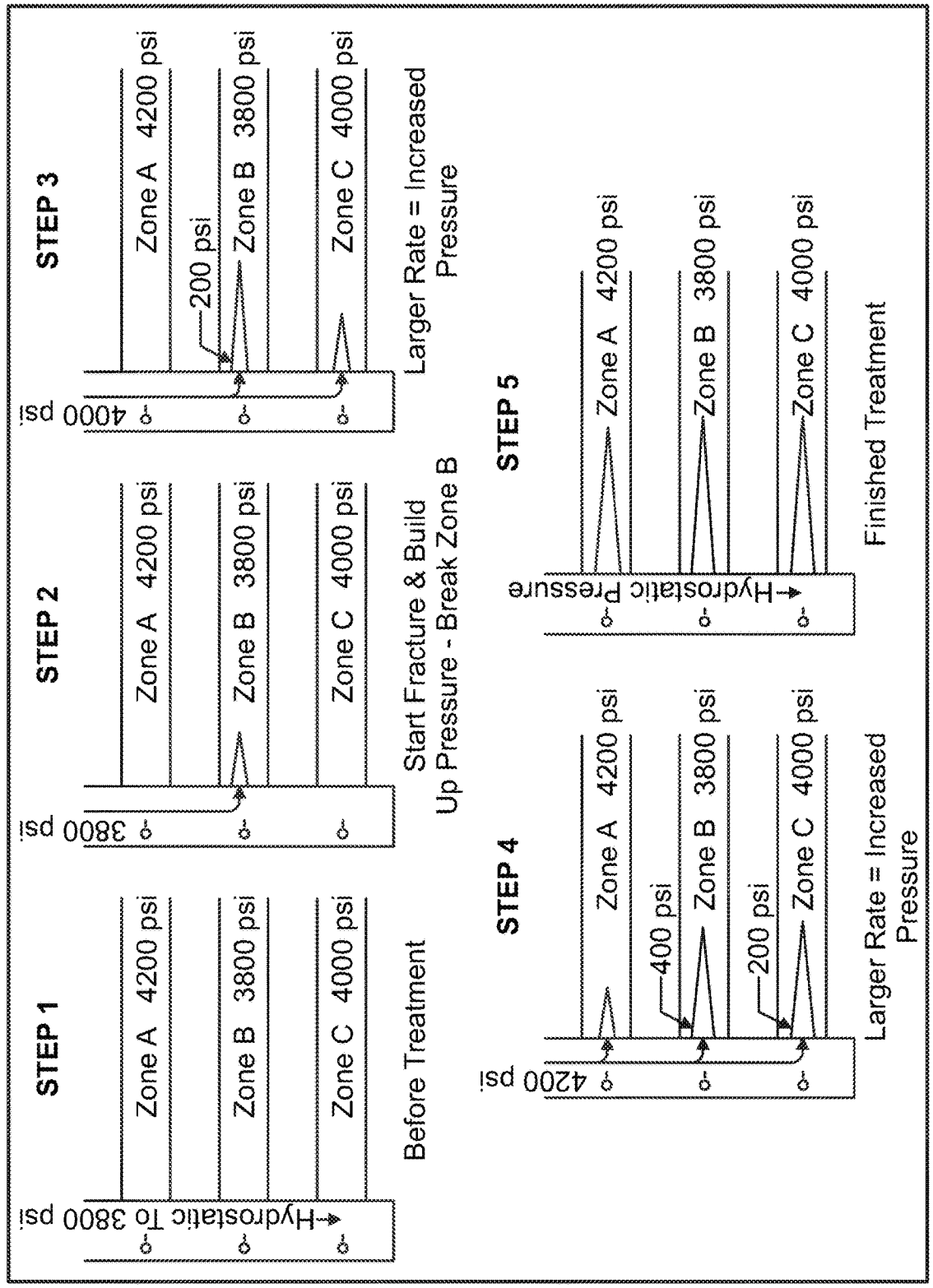
FIG. 8 is a flow chart of a stimulation process in accordance with the present inventions.

Turning to FIG. 8 there is shown a flow chart of an embodiment of a 5 step LEP fracturing program for a producing section having three stages (zones A, B, and C). The steps are performed in the order numbered.

Example 6

Figure 9A:
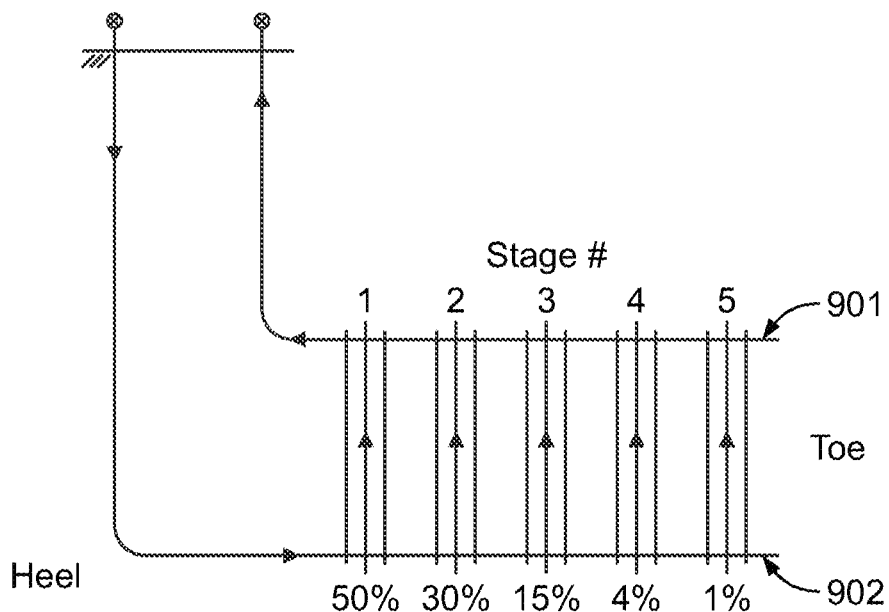
FIGS. 9A and 9B are cross sectional views of an injection well showing an embodiment of the limited entry perforation affects in accordance with the present inventions.
Figure 9B:
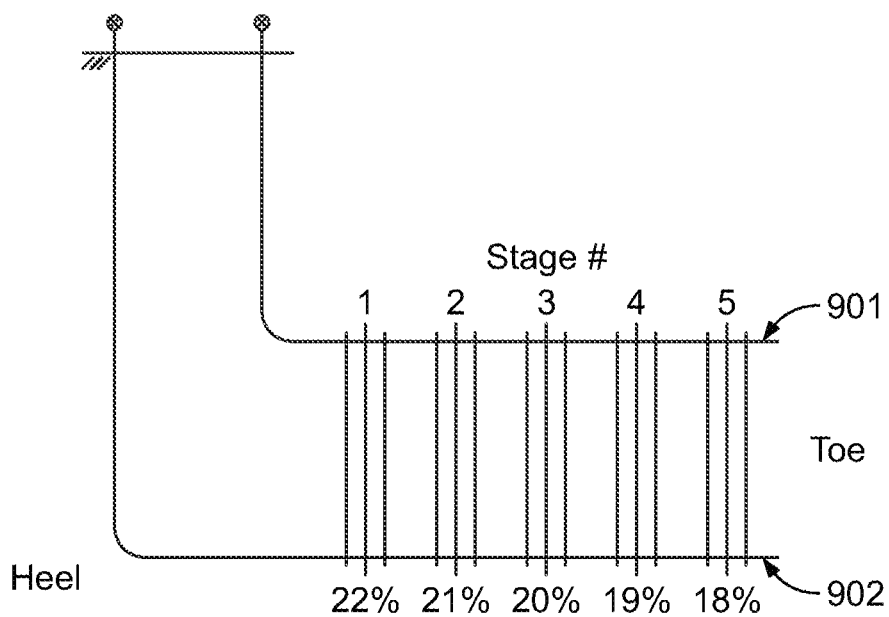

Turning to FIGS. 9A and 9B there is shown a cross schematic of a geothermal system prior to performing an LEP and after, respectively. The geothermal system has an production well 901 and a injection well 902. The system has 5 stages, corresponding to fracture zones placing the two wells in fluid communication. The flow of the fluid is shown by the arrow from the injection well 902 to the production well 901. Prior to LEP, the stages have a flow distribution of 50%, 30%, 15%, 4% and 1%, as the stages are located further from the heel and closer to the toe of the well. Thus there is a difference in flow of 49% between stage 1 and state 5 of the well prior to LEP. FIG. 9B shows the flow properties of the well after they have been optimized by the LEP procedure. The flows from heel to tow are 22%, 21%, 20%, 19% and 18%. The greatest difference in flow is 4% across the entire length of the producing section and for all stages.

Example 7

Figure 10:
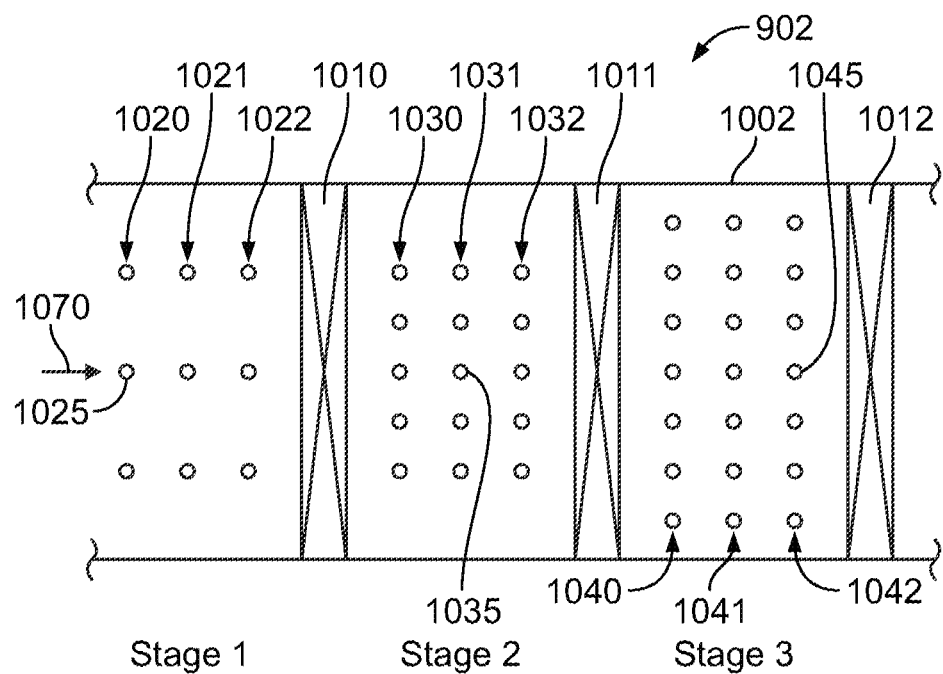
FIG. 10 is a cross sectional view of a tubular of an injection well showing an embodiment of the limited entry perforation process.

For the injection well 902 of Example 6, FIG. 10 shows a detailed cross sectional schematic view of stages 1, 2, and 3, during an LEP procedure. Thus, the injection well 902 has a casing or tubular 1002, that has plugs, e.g., frac-plugs, 1010, 1011, 1012, inserted within the tubular 1002 to isolate the three stages, 1, 2, 3. The frac-plugs are configured so that each of the stages can be isolated during hydraulic fracturing. The flow of the fracturing fluid would be as shown by arrow 1070 (this would also be the direction of flow of the working fluid during operation). Stage 1 has three clusters of perforations 1020, 1021, 1022, each having three perforations, e.g., 1025. Stage 2 has three clusters of perforations, 1030, 1031, 1032, each having five perforations, e.g., 1035, Stage 3 has three clusters of perforations, 1040, 1041, 1042, each having seven perforations, e.g., 1045.

During operation the frac-plugs 1010, 1011, 1012 are removed, and the operating fluid is flowed through the tubular 1002 in the direction of arrow 1070. The flow rate of operating fluid "q" in the tubular 1002 leaves flows out of each stage at a rate of q/5. The difference in the perforation clusters for each stage compensates for the differences in the initial flow of the system (as shown in FIG. 9A) thus providing for even flow out of each of the stages. (It being understood, that Stages 4, and 5, which are not shown, would have increasing numbers of perforations, to provide for the uniform flow rate of q/5 for all five stages.)

Example 8

Figure 11:
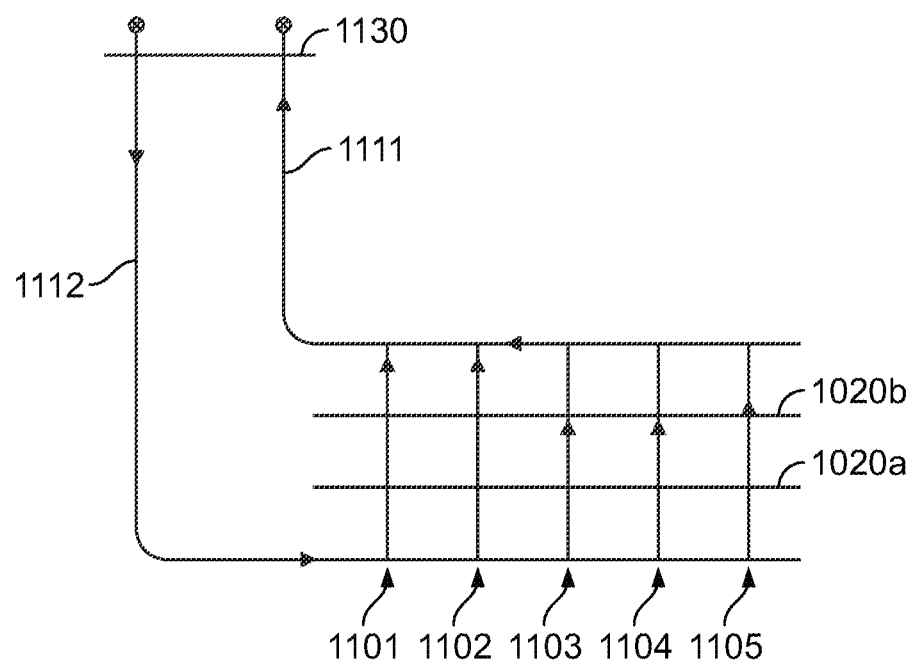
FIG. 11 is a cross sectional view of an embodiment of a limited entry perforation geothermal system in accordance with the present inventions.

Turning to FIG. 11 there is shown a cross sectional view of a geothermal system where the limited entry perforation method is implemented. The system has an injection well 1112 and a production well 1111 that extend below the surface 1130 of the earth into a pay zone of a formation. The system has five stages, 1101, 1102, 1103, 1104, 1105. The stages are configured for the limited entry perforation effect, such as for example the configuration of Example 10. The system has an even, uniform, and linear flow and temperature front across the pay zone between the producing sections of the injection and production wells. This even flow and temperature front is also maintained over time. The flow and temperature front is shown by line 1020a at time $t_1$, and is shown by line 1020b at time $t_2$, where $t_2$ is greater than $t_1$.

Example 9

In one embodiment of the invention, a field test procedure describes a method to determine the injectivity of a hydraulic stimulation treatment stage as a pre-characterization step directly before the treatment. A treatment stage is isolated using zonal isolation technology. The stage is completed with multiple perforation clusters. A pressure transient test is performed to characterize the injectivity of the stage prior to pumping the stimulation treatment. The pressure transient test could involve i) a traditional constant rate injection test, ii) a tendency for shear stimulation test, iii) a diagnostic fracture injection test, iv) a step-rate injection test, v) a step-pressure injection test, or vi) some combination thereof. The pre-characterization tests are performed on a stage-by-stage basis to characterize heterogeneity in flow properties along the wellbore.

Example 10

In one embodiment of the invention, a field testing procedure describes a method to characterize the potential for splay fractures to propagate from the tips of preexisting natural fractures. Natural fractures intersecting the wellbore are characterized during drilling or prior to installation of the casing; this step can be done, for example, by analyzing lost circulation zones, analyzing mudlog data, performing wellbore image logs, or performing wireline pressure/temperature/spinner logs. Distributed strain sensing fiber optics are installed in the wellbore behind casing. Prior to performing a stimulation treatment, a zone that has been previously identified to have intersected a natural fracture is isolated and perforated. Pressure in the zone is elevated to a level that causes the natural fracture to slip. The pressure transient is analyzed to determine whether a splay fracture formed off the tip of the natural fracture. The distributed strain sensing data is interpreted for signatures of a splay fracture. One or more tests is performed to characterize the overall tendency for splay fracturing to occur in the formation.

Example 11

In one embodiment of the invention, a field testing procedure describes a method to characterize the potential for propagating fractures to terminate against or propagate through preexisting natural fractures. Natural fractures intersecting the wellbore are characterized during drilling or prior to installation of the casing; this step can be done, for example, by analyzing lost circulation zones, analyzing mudlog data, performing wellbore image logs, or performing wireline pressure/temperature/spinner logs. A fracture with sufficient inclination relative to the borehole is selected. A section of the wellbore is isolated with packers at a location offset from the natural fracture at a distance sufficient that a propagating fracture would likely intersect the natural fracture at some distance away from the wellbore. Fluid is pumped into the isolated section of the wellbore at rates and pressures sufficient to initiate and propagate a fracture away from the well. The pressure transient is analyzed to identify the signature of the propagating fracture intersecting, arresting against, or propagating through the natural fracture. The distributed strain sensing data is interpreted for signatures of the propagating fracture intersecting, arresting against, or propagating through the natural fracture. One or more tests is performed to characterize the overall tendency for propagating fracture to terminate against natural fractures in the formation.

Example 12

A geothermal well system has an injector well and a production well. The injection well having 15 stages along a lateral producing section. The injection well having a casing cemented in place into the formation. The casing and cement being perforated. The injection well and the production well are in fluid communication with each other through a network of mixed-mechanism fractures in the formation. The injection of the working fluid will flow the mixed-mechanism fractures, and proppant if present, and be heated.

Example 13

The geothermal well of Example 12 can have any of the competition designs, e.g., stagers, clusters, phasing, proppant size, etc., and combinations and variations of these, that are set forth in this specification.

Example 14

A geothermal field having well system that has from 2 to 10 production wells and from 1 to 4 injector wells associated with, and in fluid communication with, a production well. The injection wells having from 3 to 20 stages along lateral producing sections. The injection wells having a casing cemented in place into the formation. The casing and cement being perforated. The injection wells and their associated production well are in fluid communication with each other through a network of mixed-mechanism fractures in the formation. The injection of the working fluid will flow the mixed-mechanism fractures, and proppant if present, and be heated.

Example 15

A geothermal field having from 1 to 10 vertical production wells extending from the surface into a pay zone. The vertical production wells have associated with them and are in fluid communication with injection wells. One, two, or more injection wells are associated and in fluid communication with the production wells.

It being understood that in embodiments of systems and wells the injection well, the production well, and both can have the same or different orientations and these orientations may vary along the length of the well. These orientations, in the pay zone, can be vertical, on an angle from vertical, to and including horizontal, can have orientations ranging from 0° i.e., vertical, to 90°, i.e., horizontal and greater than 90° e.g., such as a heel and toe and combinations of these such as for example "U" and "Y" shapes. These wells may further have segments or sections that have different orientations, they may have straight sections and arcuate sections and combinations thereof; and for example, may be of the shapes commonly found when directional drilling is employed.

Example 16

A geothermal field having from 1 to 10 production wells extending from the surface into a pay zone. These production wells have horizontal sections in the pay zone. The horizontal sections of the production wells have associated with them and are in fluid communication with vertical injection wells. One, two, or more of the vertical injection wells are associated and in fluid communication with the production wells.

Example 17

The geothermal well of Examples 2, 3, 14, 15 and 16 can have any of the competition designs, e.g., stagers, clusters, phasing, proppant size, etc., and combinations and variations of these, that are set forth in this specification.

Example 18

A geothermal well system, such as for example the geothermal well system of Examples 2, 3, and 12-17, can have sensors and monitors associated with the system. These sensors and monitors can be downhole, surface, in monitoring wells and combinations and variations of these. These sensors and monitors can measure and record real time conditions of the well such as seismic, acoustic, pressure and temperature as various locations along the well, in the reservoir and both. These sensors and monitors can be devices and systems such, distributed fiber optic networks, smart well systems, intelligent completions, distributed temperature fiber optics, and distributed acoustic sensing fiber optics, and combinations and variations of these, to name a few. The sensors and monitors, e.g., distributed fiber optics, can be permanently fixed into the well, such as in the cement, they can be temporarily placed in the well, such as by a wire line and both.

In an embodiment of an intelligent completion incorporates permanent downhole sensors and surface-controlled downhole flow control valves, that monitor, evaluate, and actively manage production, injection and both, in real time without any well interventions. Data is transmitted to surface for local or remote monitoring in preferably a digital well control platform.

The intelligent completion, or other sensing and monitoring systems and equipment are used to obtain data and information, as well as access historic data, top provide information to develop perforation and fracture plans, to fine tune or enhance perforation and fracture plans, to rework wells, and to change perforation and fracture plans as a well system is reworked, completed and both.

HEADINGS AND EMBODIMENTS

It should be understood that the use of headings in this specification is for the purpose of clarity, and is not limiting in any way. Thus, the processes and disclosures described under a heading should be read in context with the entirely of this specification, including the various examples. The use of headings in this specification should not limit the scope of protection afford the present inventions.

The various embodiments of systems, compositions, articles, uses, applications, equipment, methods, activities, and operations set forth in this specification may be used for various other fields and for various other activities, uses and embodiments. Additionally, these embodiments, for example, may be used with: existing systems, compositions, articles, uses, applications, equipment, methods, activities, and operations; may be used with systems, compositions, articles, uses, applications, equipment, methods, activities, and operations that may be developed in the future; and with such systems, compositions, articles, uses, applications, equipment, methods, activities, and operations that may be modified, in-part, based on the teachings of this specification. Further, the various embodiments and examples set forth in this specification may be used with each other, in whole or in part, and in different and various combinations. Thus, the configurations provided in the various embodiments and examples of this specification may be used with each other. For example, the components of an embodiment having A, A' and B and the components of an embodiment having A", C and D can be used with each other in various combination, e.g., A, C, D, and A. A" C and D, etc., in accordance with the teaching of this Specification. Thus, the scope of protection afforded the present inventions should not be limited to a particular embodiment, example, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A well system for recovery of geothermal energy, the system comprising:
- an injection well in a geothermal reservoir below a surface of earth;
- a producing well in the geothermal reservoir;
- a fluid flow path through the geothermal reservoir and placing the injection well and the producing well in fluid communication, wherein the system is configured to flow a heat recovery fluid from the injection well through the reservoir and into the producing well;
- the fluid flow path comprising a plurality of fracture zones, wherein at least two of the fracture zones have different flow characteristic;
- the injection well comprising a plurality of stages, wherein each of the stages includes a predetermined perforation pattern, the predetermined perforation pattern based in part on respective flow characteristics of the fracture zones, wherein the predetermined perforation pattern is configured to be used to make perforations at each of the stages, the predetermined perforation pattern defined before the perforations occur; and
- wherein the system is configured to provide for a substantially uniform flow between the injection well and a production well.

2. The system of claim 1, wherein the perforations in at least one of the stages is zero phased.

3. The system of claim 1, wherein the perforations in at least one of the stages is 60° phased.

4. The system of claim 1, wherein the plurality of fracture zones comprise a plurality of proppants.

5. The system of claim 4, wherein the proppants define a proppant pack.

6. The system of claim 5, wherein the proppant pack comprises a monolayer distribution of the proppant in the plurality of fracture zones.

7. The system of claim 4, wherein the proppants comprise microproppants.

8. The system of claim 1, wherein a majority of each of the plurality of fracture zones have a different flow characteristic.

9. The system of claim 1, wherein the system is configured to provide for a substantially uniform temperature front of a heat recovery fluid through the reservoir between the injection well and the production well.

10. The system of claim 1, wherein the substantially uniform flow is characterized in part by having a flow across at least 85% of the perforations that is uniform.

11. The system of claim 1, wherein the predetermined perforation pattern includes at least one of a number of perforations, a distribution of perforations, a density of the perforations, a diameter of the perforations, a shape of the perforations, an orientation of the perforations, a phasing of the perforations, a depth of penetration of the perforations, an energy of a perforation shot charge, or a type of perforation shot charge.

12. The system of claim 1, wherein the predetermined perforation pattern is first defined in a pre-characterization modeling step before the plurality of perforations occur, and wherein the perforation pattern is generated using the pre-characterization modeling step.

13. The system of claim 12, wherein the pre-characterization modeling step is analytical modeling, computational modeling, or data analytics modeling.

14. A method to achieve even flow in fractures distributed across two or more stages of a borehole having vertical and horizontal sections, the method comprising:
- selecting a horizontal section of the borehole in a reservoir containing a natural resource;
- wherein the selected horizontal section defines a length and comprises a series of hydraulic fracture treatment stages;
- pre-defining perforation patterns for each stage of a plurality of stages along the length of the selected horizontal section, wherein each perforation pattern includes a series of perforation holes that cause a friction pressure drop when fluid flows through, wherein a respective pattern of the perforation patterns is pre-defined before perforations occur; and
- wherein the perforation patterns for the plurality of stages are configured to produce substantially uniform flow during hydraulic fracture treatment operations and during production operations.

15. The method of claim 14, wherein substantially uniform flow includes a rate from about 40 Kg/s to about 100 Kg/s.

16. The method of claim 14, wherein the fluid comprises a proppant.

17. The method of claim 14, wherein each perforation pattern is configured to comprise at least one of a number of perforations, a phasing of the perforations, a diameter of the perforations, a shape of the perforations, a spacing of the perforations, or a depth of penetration of the perforations.

18. The method of claim 14, wherein the perforation patterns for the plurality of stages are configured to produce a substantially uniform temperature front of a heat recovery fluid during production operations.

19. The method of claim 14, wherein the perforation patterns are first defined in a pre-characterization modeling step before the plurality of perforations occur, and wherein the perforation patterns are generated using the pre-characterization modeling step.

20. The method of claim 19, wherein the pre-characterization modeling step is analytical modeling, computational modeling, or data analytics modeling.

* * * * *